(12) United States Patent
Ayyagari et al.

(10) Patent No.: US 9,137,847 B1
(45) Date of Patent: Sep. 15, 2015

(54) APPLICATION OF POTENTIAL FIELD METHODS IN DIRECTING AGENTS

(75) Inventors: Arun Ayyagari, Seattle, WA (US); Craig Farris Battles, Seattle, WA (US); Michael A. Dorsett, Federal Way, WA (US)

(73) Assignee: THE BOEING COMPANY, Chicago, IL (US)

( * ) Notice: Subject to any disclaimer, the term of this patent is extended or adjusted under 35 U.S.C. 154(b) by 1593 days.

(21) Appl. No.: 12/494,089

(22) Filed: Jun. 29, 2009

(51) Int. Cl.
*H04W 84/18* (2009.01)
*G05B 19/04* (2006.01)
*H04W 88/00* (2009.01)
*H04W 16/00* (2009.01)

(52) U.S. Cl.
CPC .................................... *H04W 84/18* (2013.01)

(58) Field of Classification Search
CPC ...... H04W 84/18; H04W 84/20; H04W 84/22
USPC ................................................. 700/245–264
See application file for complete search history.

(56) References Cited

U.S. PATENT DOCUMENTS

| | | | |
|---|---|---|---|
| 5,475,393 A | 12/1995 | Heinzerling | |
| 5,714,948 A | 2/1998 | Farmakis et al. | |
| 5,961,568 A | 10/1999 | Farahat | |
| 6,160,998 A | 12/2000 | Wright et al. | |
| 6,370,560 B1 | 4/2002 | Robertazzi et al. | |
| 7,114,388 B1 | 10/2006 | French et al. | |
| 7,463,890 B2 | 12/2008 | Herz et al. | |
| 8,140,658 B1 | 3/2012 | Gelvin et al. | |
| 8,185,265 B2 * | 5/2012 | Nagano | 701/25 |
| 8,194,573 B1 | 6/2012 | Smith et al. | |
| 2002/0044533 A1 | 4/2002 | Bahl et al. | |
| 2004/0236547 A1 | 11/2004 | Rappaport et al. | |
| 2006/0039286 A1 | 2/2006 | Basu et al. | |
| 2007/0253341 A1 | 11/2007 | Atkinson et al. | |
| 2009/0037033 A1 * | 2/2009 | Phillips et al. | 701/2 |
| 2009/0201899 A1 * | 8/2009 | Liu et al. | 370/338 |
| 2009/0252134 A1 | 10/2009 | Schlicht et al. | |
| 2010/0074141 A1 | 3/2010 | Nguyen | |
| 2010/0114633 A1 * | 5/2010 | Sislak et al. | 705/7 |
| 2010/0286824 A1 * | 11/2010 | Solomon | 700/248 |
| 2012/0191332 A1 * | 7/2012 | Sawhill et al. | 701/120 |

OTHER PUBLICATIONS

Ayyagari, A., Harrang, J. P., & Ray, S. (Oct. 1996). Airborne information and reconnaissance network. In Military Communications Conference, 1996. MILCOM'96, Conference Proceedings, IEEE (vol. 1, pp. 230-234). IEEE.*

(Continued)

*Primary Examiner* — Khoi Tran
*Assistant Examiner* — Dale Moyer
(74) *Attorney, Agent, or Firm* — Toler Law Group, PC

(57) ABSTRACT

Computer-implemented methods are disclosed for the application of potential field methods in directing agents. A task is assigned for each of a plurality of mobile communication nodes. A dynamic model is assigned for characterizing a behavior of the nodes. Potential fields are applied to the dynamic model to direct movement of each of the nodes such that the nodes each perform the assigned task with the plurality of mobile communications nodes providing a communications network to serve a communications area.

15 Claims, 20 Drawing Sheets

(56) References Cited

OTHER PUBLICATIONS

Howard, A., Mataric, M. J., & Sukhatme, G. S. (Jun. 2002). Mobile sensor network deployment using potential fields: A distributed, scalable solution to the area coverage problem. In Proceedings of the 6th International Symposium on Distributed Autonomous Robotics Systems (DARS02) (pp. 299-308). Fukuoka: Springer-Verlag Tokyo.*

Ma, K., Zhang, Y., & Trappe, W. (2008). Managing the mobility of a mobile sensor network using network dynamics. Parallel and Distributed Systems, IEEE Transactions on, 19(1), 106-120.*

Oussama Khatib, Inertial Properties in Robotic Manipulation: An Object-Level Framework, The International Journal of Robotics Research, vol. 13, No. 1, Feb. 1995, pp. 19-36.

Oussama Khatib, Real-Time Obstacle Avoidance for Manipulators and Mobile Robots, The International Journal of Robotics Research, vol. 5, No. 1, Spring 1986, pp. 90-98.

Luis Sentis, Synthesis and Control of Whole-Body Behaviors in Humanoid Systems, Ph.D. Dissertation submitted to Stanford University, Jul. 2007, 208 pages.

Sentis et al., Large Scale Multi-Robot Coordination Under Network and Geographical Constraints, International Symposium on Industrial Electronics, 8 pages.

Ghosh, A. et al, "Coverage and connectivity issues in wireless sensor networks: A survey," Pervasive and Mobile Computing 4, Jun. 2008, vol. 4, Issue 3, Elsevier, Amsterdam, Netherlands, pp. 303-334.

He, Y. et al, "Sensor Network Nodes Deployment Based on Artificial Potential Functions," 2008 IEEE Intelligent Vehicles Symposium, Jun. 2008, IEEE, Piscataway, New Jersey, pp. 464-469.

Wang, B. et al., "A survey of movement strategies for improving network coverage in wireless sensor networks," Computer Communications, Aug. 2009, vol. 32, Issue 13, Elsevier, Amsterdam, Netherlands, pp. 1427-1436.

Stentz, A., "Optimal and Efficient Path Planning for Partially-Known Environments," Proceedings of the IEEE International Conference on Robotics and Automation (ICRA '94), May 1994, IEEE, Piscataway, New Jersey, pp. 3310-3317.

Stentz, A., "The Focused D* Algorithm for Real-Time Replanning," IJCAI'95 Proceedings of the 14th international joint conference on Artificial intelligence, Aug. 1995, vol. 2, Morgan Kaufmann Publishers Inc., San Francisco, CA, pp. 1652-1659.

Koenig, S. et al., "D* Lite," AAAI-02 Proceedings, 2002, Association for the Advancement of Artificial Intelligence, Menlo Park, CA, pp. 476-483.

Nilsson, N., "State-Space Search Methods," Problem-Solving Methods in Artificial Intelligence, 1971, McGraw-Hill Book Company, New York, New York, pp. 65-68.

Brock, O., et al., "Real-time Replanning in High-Dimensional Configuration Spaces Using Sets of Homotopic Paths," IEEE International Conference on Robotics and Automation, 2000. Proceedings. ICRA '00, Apr. 2000, vol. 1, IEEE, Piscataway, NJ, pp. 550-555.

Khatib, O., "A Unified Approach for Motion and Force Control of Robot Manipulators: The Operational Space Formulation," IEEE Journal of Robotics and Automation, Feb. 1987, vol. RA-3, No. 1, IEEE, Piscataway, NJ, pp. 43-53.

U.S. Appl. No. 12/873,182, filed Aug. 31, 2010, 85 pages.

Weisstein, Eric W. "Method of Steepest Descent." From MathWorld—A Wolfram Web Resource, http://mathworld.wolfram.com/MethodofSteepestDescent.html, 1999-2015 Wolfram Research, Inc.

* cited by examiner

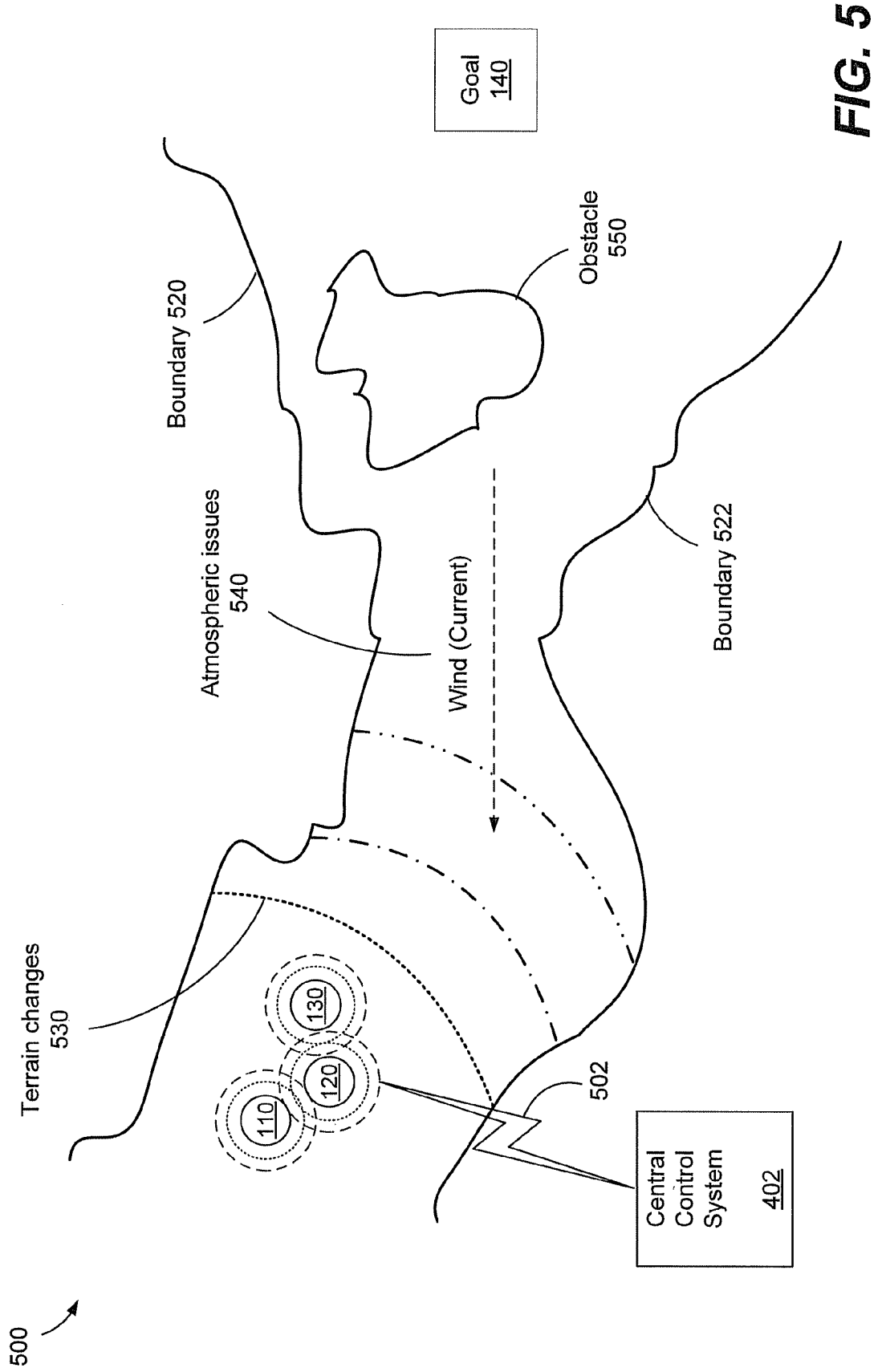

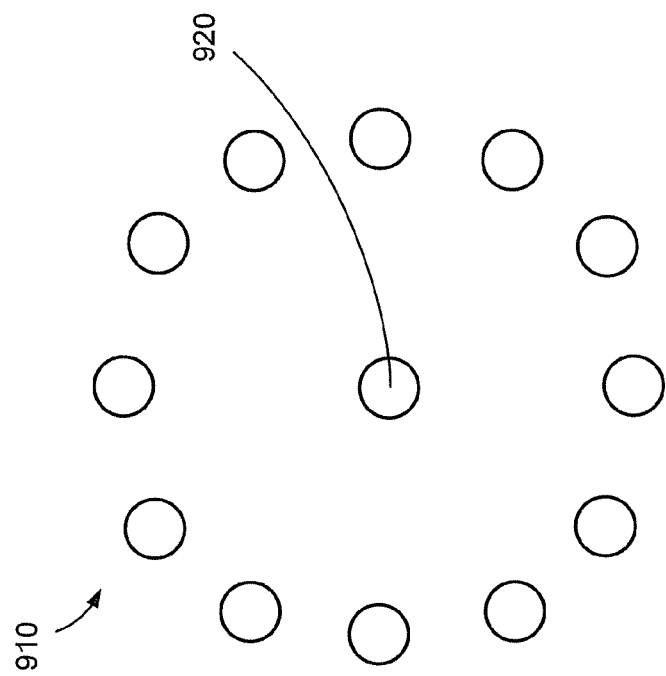
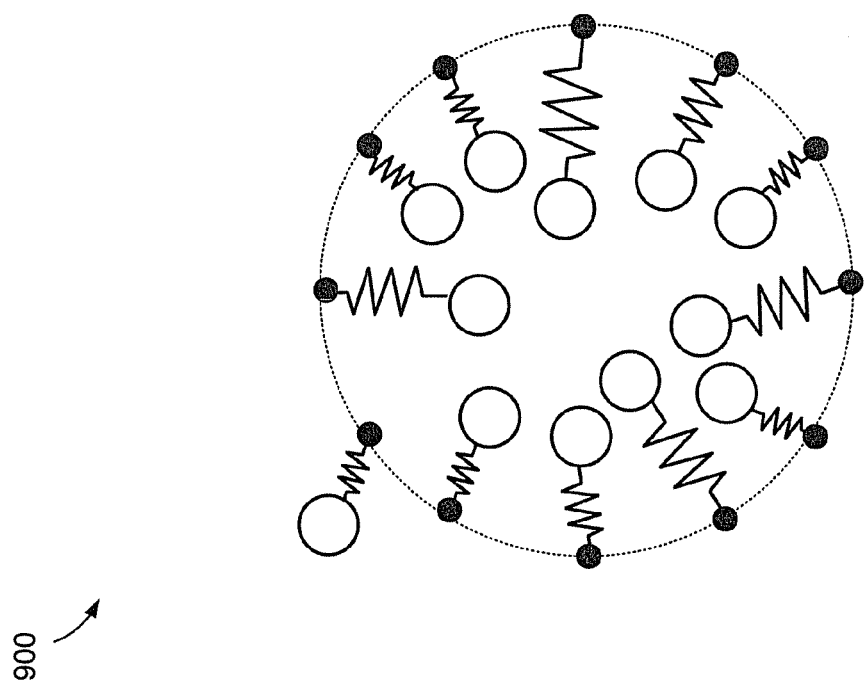
FIG. 9

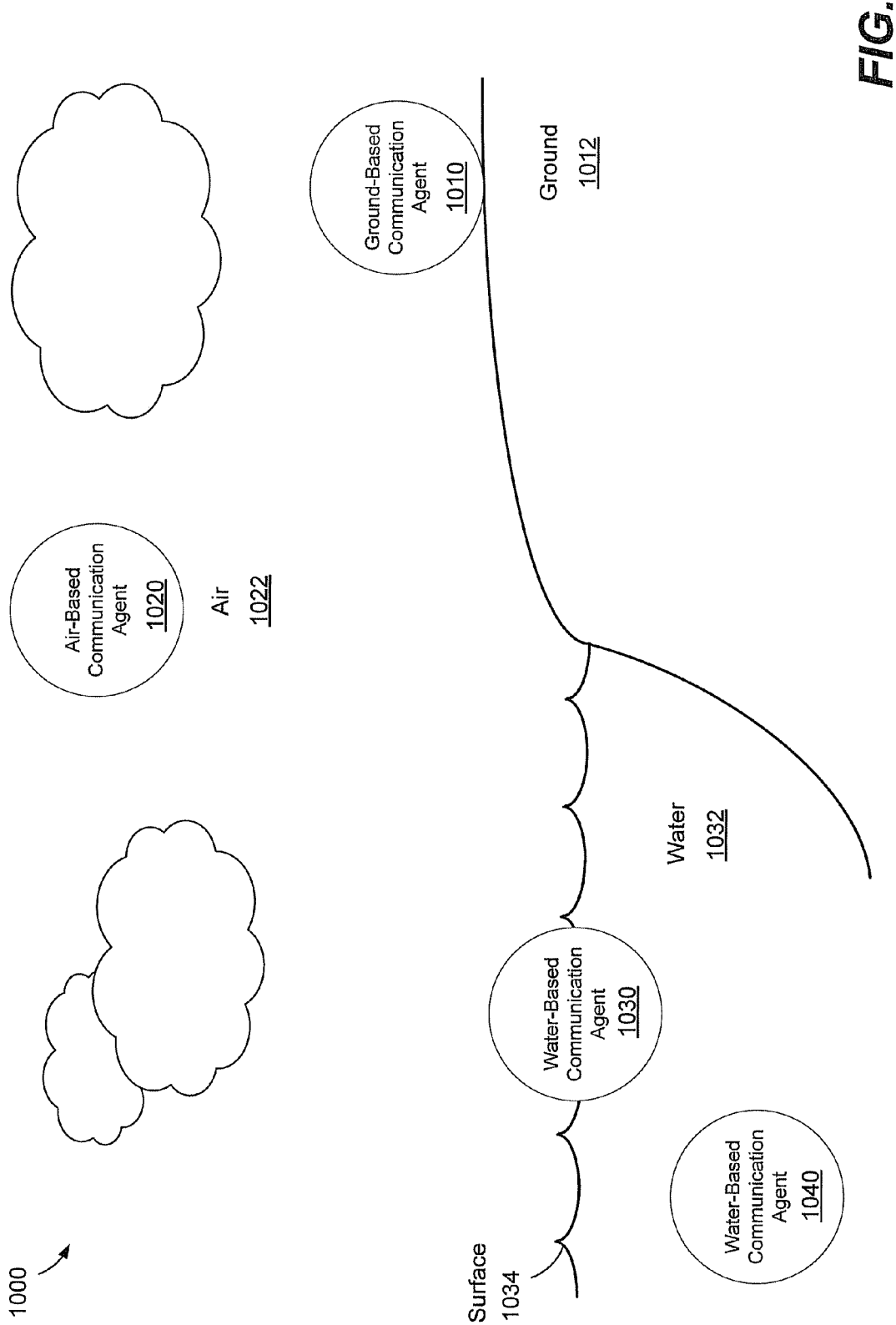

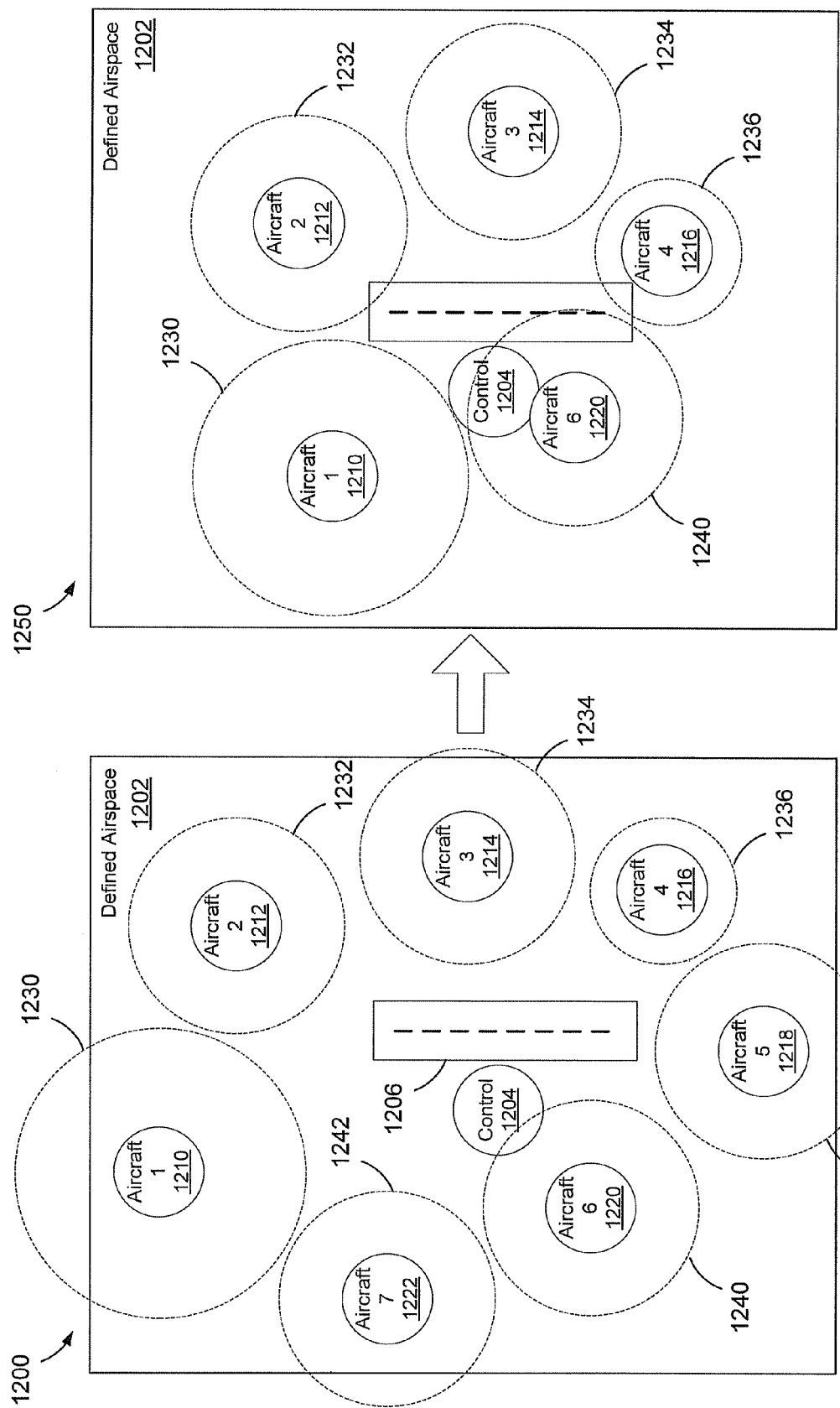

APPLICATION OF POTENTIAL FIELD METHODS IN DIRECTING AGENTS

FIELD OF THE DISCLOSURE

The present disclosure is generally related to applying potential fields in directing a plurality of agents or nodes.

BACKGROUND

Agents or nodes that participate in performance of a task, whether the agents or nodes are autonomous devices or human-controlled devices relying on automated control systems, may seek to dynamically coordinate their movements and positions to aid in the collective performance of the task. There are myriad examples of systems in which agents manually coordinate their movements to act in harmony with a group of similarly-situated agents. To take just one example, in landing at commercial airports, pilots rely on instructions from air traffic control to provide a course that allows the aircraft to land while providing a reasonable safety margin between the aircraft and other aircraft in the same airspace.

The coordination task of landing the aircraft is complex. In coordinating the approach and landing of aircraft, what constitutes a reasonable safety margin may depend on the types of aircraft in the airspace and how the aerodynamics of each type of aircraft affects nearby aircraft. Changing atmospheric and visibility conditions affect what constitutes a safe margin between aircraft. Variance in numbers of aircraft entering the airspace and the approach vectors the aircraft use to enter the airspace constantly changes the conditions. As soon as a plan has been established for coordinating the approach landing of the aircraft, additional aircraft may enter the airspace and the added aircraft may change the prior plan. Furthermore, unexpected events may occur, such as a runway being closed, that would involve altering the original plan. Notwithstanding the coordination problems to be resolved, operators of all aircraft in the airspace desire landing as soon as possible to save fuel and to meet schedules so that cargo can be routed on time and so that passengers can make connections.

With coordinating the approach and landing of aircraft as just one example of the difficulty in coordinating complex group operations, it would be desirable to automate processes to coordinate movement of vehicles and analogous coordinated deployments. Furthermore, it would be desirable to identify a robust system for dynamically coordinating deployments and movements of a plurality of nodes in a manner that is reliable, adaptable, and capable of being distributed.

SUMMARY

Embodiments disclosed herein include computer-implemented methods for coordinating deployment or movement of a plurality of agents. Embodiments disclosed herein use the application of potential field methods to coordinate deployment of network nodes, to coordinate air traffic control of a plurality of aircraft, and to coordinate movement of a plurality of vehicles.

According to embodiments of the present disclosure, potential fields are assigned to each of a plurality of agents participating in a shared operation. The potential fields account for generalized physical forces, dynamic properties, and operation considerations of each of the plurality of agents. Based on the potential fields, a generalized acceleration is determined from the potential fields for each of the agents and the generalized acceleration is integrated to determine a trajectory for each of the agents to reach a specific goal. According to an illustrative embodiment, each of the plurality of agents shares information with others of the plurality of agents about its operating situation, and each of the plurality of agents is aware of the goal of each of the agents. As a result, the trajectory for each of the agents can be determined by a central node or the trajectory for each of the agents can be determined by each of the nodes independently. Potential fields involve low computational overhead, enabling each of the agents to calculate trajectories for each of the agents even though each of the agents may have limited computing resources. By enabling each of the agents to calculate trajectories for itself and the other agents, the plurality of agents is not dependent upon a central node. Each of the agents can adjust the trajectories for unexpected events that may occur.

According to an illustrative embodiment, a computer-implemented method is used to position a plurality of mobile communication nodes. A task is assigned for each of a plurality of mobile communication nodes. To characterize behavior of the plurality of communication nodes, a dynamic model is assigned. Potential field methods are applied to the dynamic model in order to direct movement of each of the plurality of mobile communication nodes. Each of the plurality of mobile communications nodes performs the assigned task. The mobile communications nodes thus form a communications network to serve a communications area. In various embodiments, the dynamic model may be based on operational considerations potentially affecting movability or communication capabilities of each of the plurality of mobile communication nodes and maintaining communication between each of the plurality of mobile communication nodes based on communication range parameters for each of the plurality of mobile communication nodes. Furthermore, to direct the movement of the plurality of mobile communication nodes, a generalized acceleration may be determined from the potential fields for the plurality of mobile communication nodes. The generalized acceleration may be integrated for each of the plurality of mobile communication nodes to generate trajectories for each of the plurality of mobile communication nodes.

According to another illustrative embodiment, a computer-implemented method controls landing of a plurality of aircraft in a defined airspace monitored by an air traffic control system. A next aircraft that enters the defined airspace is identified. An aircraft type of the next aircraft is determined. The next aircraft is added to a monitored aircraft list of a plurality of aircraft in the defined airspace. Potential fields are applied to model a positioning plan for the defined airspace to provide enough distance between each of the plurality of aircraft based on position, dynamics, and the aircraft type of the next aircraft. A generalized acceleration of the plurality of aircraft may be determined from the potential fields. The generalized acceleration for each of the plurality of aircraft may be integrated to obtain flight trajectories for each of the plurality of aircraft. A specified aircraft of the plurality of aircraft is selected to land. The method may be reapplied to direct the landing of others of the plurality of aircraft as well as to account for additional aircraft entering the defined airspace.

According to another illustrative embodiment, a computer-implemented method manages motion of a plurality of vehicles. Characteristics of each of a plurality of vehicles are identified. A specified goal for the plurality of vehicles is received. Information about conditions for movement of each of the plurality of vehicles is received. Potential fields are applied to determine a plan for each of the plurality of vehicles based on the characteristics, the specified goal, and the conditions for movement of each of the plurality of vehicle. A generalized acceleration of the plurality of vehicles is determined using the potential fields. The generalized acceleration for each of the plurality of vehicles is integrated to obtain a trajectory for each of the plurality of vehicles. Each of the plurality of vehicles is directed to move according to the trajectory determined for each of the plurality of vehicles. Upon occurrence of a predetermined discrete event, it is determined when a change has occurred that affects the movement of any of the plurality of vehicles. After determining the change has occurred, the potential fields and the plan for each of the plurality of vehicles is regenerated.

According to yet another illustrative embodiment, a computer-implemented method controls a first agent participating in a shared operation with a second agent to perform a specified task to reach a specified goal. A specified task for a first agent and a second agent for a shared operation is received. A potential fields model is applied to generate a first plan to direct movement of the first agent toward a first specified goal and to generate a second plan to direct movement of the second agent toward a second specified goal. The potential fields model accounts for generalized physical forces applied to the first agent and the second agent. The potential fields model also accounts for dynamics of the first agent and the second agent. The dynamics of an agent include position, velocity, and acceleration of the agent, operational considerations potentially affecting movement of the first agent, operational considerations potentially affecting movement of the second agent, communication capabilities of the first agent and the second agent, and preserving communication between the first agent and the second agent during performance of the specified task. A generalized acceleration is determined from the potential fields model. The generalized acceleration is then integrated for the first agent and the second agent to obtain the first plan including a first trajectory for the first agent and the second plan including a second trajectory for the second agent. The first plan is executed to cause the first agent to move toward the first specified goal. Upon occurrence of a predetermined discrete event, when a change has occurred in the generalized physical forces, the dynamics of the first agent, the dynamics of the second agent, the operational considerations, or the communications capabilities is identified. Upon identifying the change, the first plan and the second plan are regenerated.

The features, functions, and advantages that have been described can be achieved independently in various embodiments or may be combined in yet other embodiments, further details of which are disclosed with reference to the following description and drawings.

BRIEF DESCRIPTION OF THE DRAWINGS

FIG. 5 is a diagram of the plurality of agents of FIG. 2 proceeding to a specified goal through a course including boundaries, terrain changes, atmospheric issues, and an obstacle;

FIG. 9 shows a circle formation field used to align agents as a result of assigned potential fields;

FIG. 10 is a diagram of a system including different types of communication agents that may support a communication network;

FIGS. 12A and 12B show systems of aircraft in a defined airspace where the aircraft are repositioned when some of the aircraft are removed from the defined airspace;

DETAILED DESCRIPTION

According to illustrative embodiments of the present disclosure, a plurality of agents or nodes participating in a shared operation may be cooperatively moved or placed so as to satisfy specified constraints through the use of potential field methods. Potential field methods are used to model gravitational or magnetic fields by depicting how an object is affected by a plurality of forces to which the object is subjected. Potential fields may be created to model desired forces imputed to the nodes. For example, instead of using a potential field to model a magnetic force between two nodes, a potential field may be used to model a desired repulsion and a desired attraction to maintain the two nodes at a desirable communication distance where the nodes are neither too close together as to cause communication interference nor too far apart so that the nodes are beyond communication range of each other. By applying potential fields to model various constraints, such as communications parameters and object avoidance parameters, movement of each of a plurality of nodes may be calculated to control movement of the plurality of nodes as a group. Potential field methods involve relatively low computational overhead. Thus, nodes that communicate status information to each other can each compute desired trajectories for each of the nodes, and each of the nodes may honor each of the imposed constraints.

Figure 1:
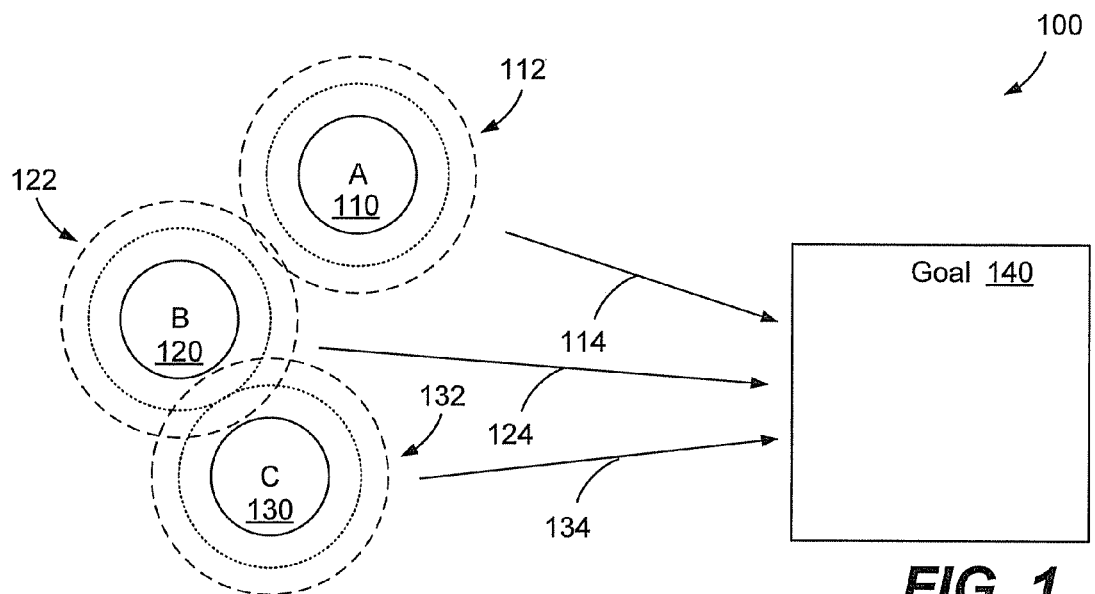
FIG. 1 is a diagram of a system of agents moving toward a specified goal as part of a shared operation.

FIG. 1 is a diagram of a system 100 of a plurality of agents, Agent A 110, Agent B 120, and Agent C 130 moving toward a specified goal 140 as part of a shared operation. Constraints imposed on the agents are represented as potential fields 112, 122, 132. The potential fields 112, 122, 132, as described further below, are used to model constraints such as desired or maximum communication ranges, collision avoidance tolerances, and other constraints that may be imposed to preserve the agents 110, 120, 130, respectively, and to facilitate success of the shared operation. The potential fields 112, 122, 132 enable each of the agents 110, 120, 130 or an extrinsic system (not shown in FIG. 1) to compute trajectories 114, 124, and 134, respectively, for each of the agents 110, 120, 130 to reach the specified goal 140 while observing the constraints represented by the potential fields 112, 122, 132.

In this detailed description, the term trajectory is used to describe the dynamic course of an agent because a trajectory connotes time sequences of positions on a course through a potentially complex space. The space through which the trajectory passes may include a three-dimensional geometric space. Instead of or in addition to geometric space, the space may also include non-geometric parameters. For example, in the case of applying potential fields to directing the positioning or movement of communication nodes as described with reference to FIGS. 11A, 11B, and 18, the communication nodes may operate in geometrical spaces as well as non-geometric spaces of transmission power, battery life, and other non-geometric parameters. Thus, a trajectory of a communication node may include changing geometric coordinates, changing speed, and changing transmission power to cover a desired communication area subject to available power constraints.

Figure 2A:
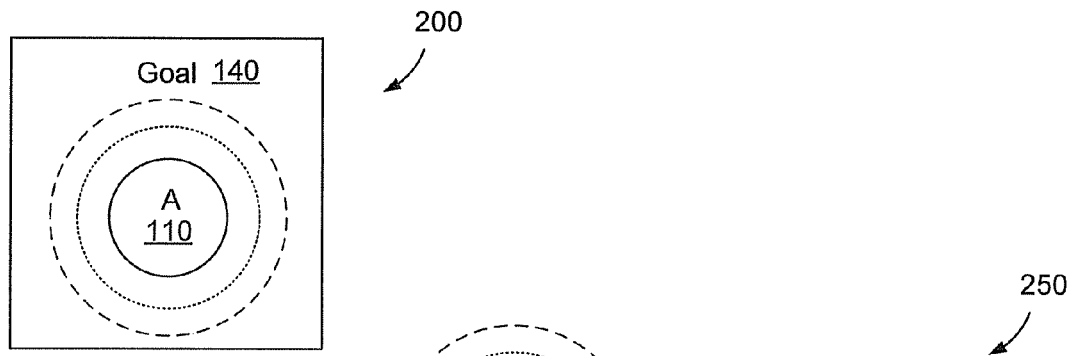
FIGS. 2A and 2B are diagrams of the system of agents of FIG. 1 exhibiting desired end behaviors upon reaching the specified goal.
Figure 2B:
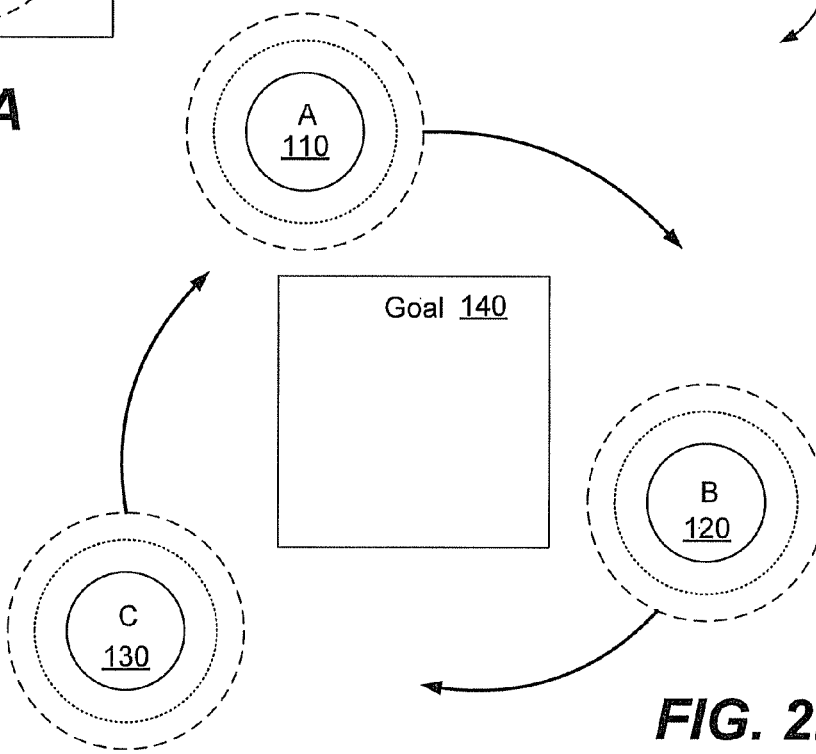

FIGS. 2A and 2B are diagrams of the plurality of agents 110, 120, 130 of FIG. 1 exhibiting desired end behaviors upon reaching the specified goal 140. FIG. 2A shows an end behavior 200 wherein one or more of the agents 110, 120, 130 proceeds to the specified goal 140 and stops at the specified goal 140. FIG. 2A shows Agent A 110 having reached the specified goal 140 and parking at the specified goal 140. Alternatively, FIG. 2B shows an end behavior 250 wherein the plurality of agents 110, 120, and 130 may be directed to circle or orbit the specified goal 140. For example, if the shared operation is to monitor the specified goal 140, the agents 110, 120, 130 may be programmed or otherwise instructed to circle the specified goal 140. Stopping upon reaching the specified goal 140, as in FIG. 2A, and circling the specified goal 140, as in FIG. 2B, are only two potential forms of end behavior. For example, the agents 110, 120, 130 may be directed to position themselves equidistantly from each other in a circle around the specified goal and stop there to monitor or protect the specified goal 140. Other embodiments may conform to any other selected end behavior.

Figure 3:
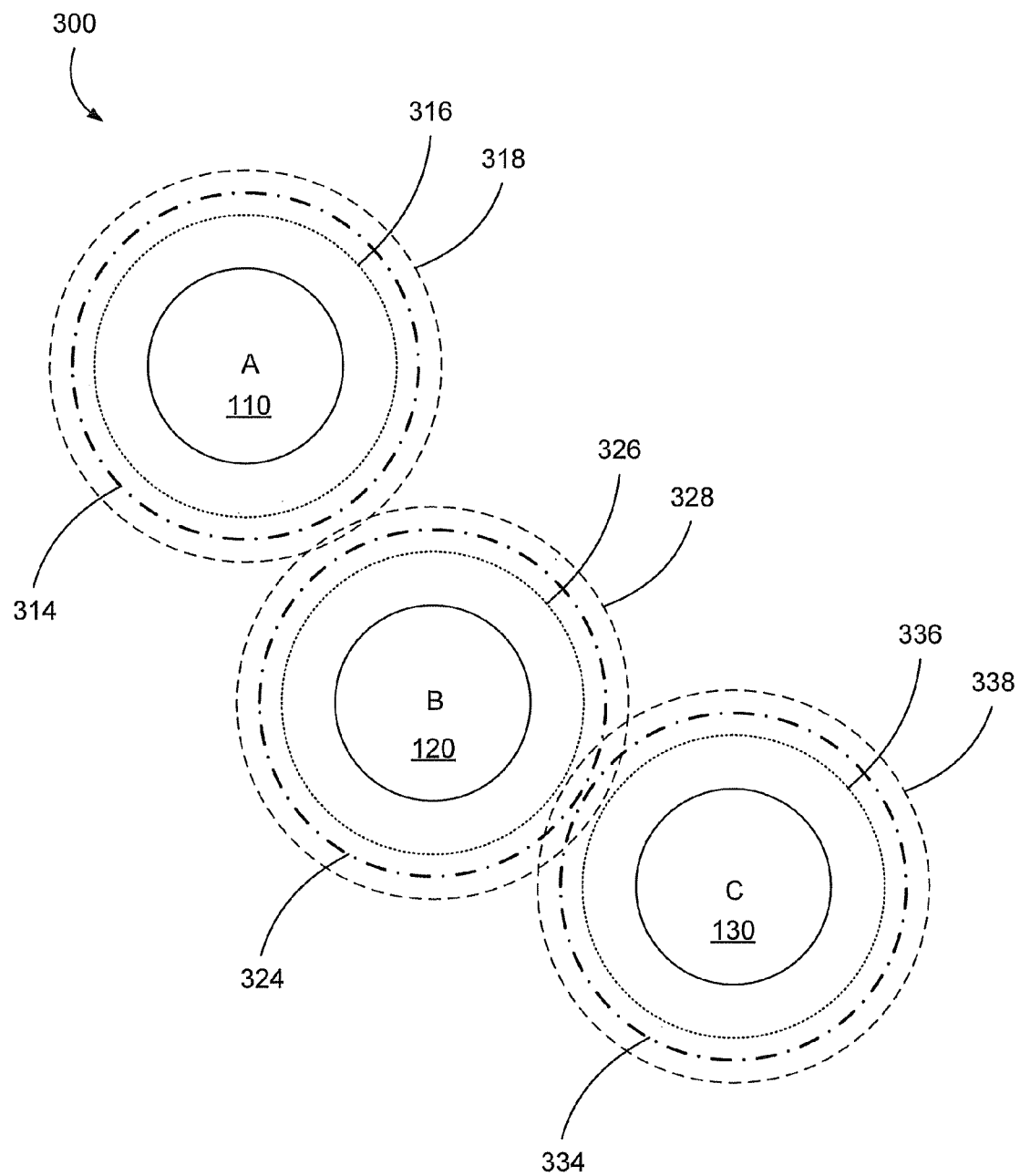
FIG. 3 is a diagram of a plurality of agents having operational characteristics represented by potential fields.

FIG. 3 is a diagram of a system 300 of the plurality of agents 110, 120, 130 having operational characteristics represented by potential fields defining minimum distances 316, 326, 336 (represented in FIG. 3 by dotted lines) and maximum distances 318, 328, 338 between agents 110, 120, 130 (represented in FIG. 3 by dashed lines). Potential fields may be used to model attractive forces and repulsive forces. Thus, potential fields may be used to cause nodes represented by the potential fields to attract each other so that the nodes 110, 120, 130 gravitate toward each other so that the nodes 110, 120, 130 will be within a maximum distance 318, 328, 338 of one another. At the same time, potential fields may be configured such that, at a predetermined distance, the nodes 110, 120, 130 repel each other so that they do not get too close together. In other words, potential fields may be configured such that the nodes 110, 120, 130 will remain apart from each other by a predetermined minimum distance 316, 326, 336, but not operate at more than a maximum distance 318, 328, 338.

The potential fields may establish minimum distances 316, 326, 336 and maximum distances 318, 328, 338 to model various constraints. For example, the minimum distances 316, 326, 336 and maximum distances 318, 328, 338 may model communication parameters by which the nodes 110, 120, 130 are within a specified maximum distance 318, 328, 338 to maintain communications with adjacent nodes. At the same time, the nodes 110, 120, 130 may be kept apart by a predetermined minimum distance 318, 328, 338 so that the nodes 110, 120, 130 are not so close together so as for communications systems to interfere with each other as may happen when transceivers are too close to one another at a given transmit power level.

As further explained below, constraints may be modeled for specified minimum distances 314, 324, 334 to provide a safety margin for collision avoidance to avoid others of the agents 110, 120, 130 or obstacles (not shown in FIG. 3). Unlike the minimum and maximum communication distances 316, 326, 336 and 318, 328, 338, respectively, the specified minimum distances for collision avoidance 314, 324, 334 may not have a countervailing specified maximum distance. In other words, for purposes of preventing aircraft from colliding or otherwise interfering with one another, there is specified minimum distance 314, 324, 334 that is imposed between aircraft, but there is no maximum specified distance between the aircraft that would create a safety problem. Thus, while potential fields for some constraints may have minima and maxima, some potential fields may have minima or maxima, but not both.

It should be noted that some constraints may automatically respect other constraints, which may simplify the overall modeling process. For example, with reference to FIG. 3, the minimum separation distance for collision avoidance 314, 324, 328 is larger than the minimum communication distance 316, 326, 336. Thus, for a system in which the agents 110, 120, 130 are aerial communication nodes that are in flight when they are supporting a communication network, honoring the minimum separation distance for collision avoidance 314, 324, 334 inherently maintains the smaller minimum communication distance 316, 326, 336 between communication nodes, so the minimum communication distance 316, 326, 336 may not be included in the application of potential fields. On the other hand, if the agents 110, 120, 130 are to support a communication network when the agents 110, 120, 130 are in motion or are stationary, when the agents 110, 120, 130 are stationary, the potential fields may address the minimum communication distance 316, 326, 336 when the minimum separation distance 314, 324, 334 is rendered moot because the agents 110, 120, 130 are stationary. Alternatively, the minimum separation distances for collision avoidance 314, 324, 334 may be less than the minimum distances for communications interference 316, 326, 336, such that the minimum separation distances for collision avoidance 314, 324, 328 are moot whenever the communications network is in operation. Furthermore, any potentially competing constraints may be prioritized to enable resolution of potential conflicts, as described further below.

Using potential fields to model constraints provides flexibility as compared to trying to fix the nodes 110, 120, 130 at fixed distances from each other. Specifying fixed distances may be difficult or unworkable in light of competing constraints. For example, if the nodes 110, 120, 130 are moving between boundaries (not shown in FIG. 3), collision avoidance constraints may drive the nodes 110, 120, 130 closer to each other to avoid the boundaries. To avoid collisions with the boundaries, the nodes 110, 120, 130 may be driven toward each other inside a minimum distance 116, 126, 136 established to avoid communications interference. Collision avoidance may be prioritized over avoiding communications interference to enable the nodes 110, 120, 130 to enable flexibility, for example, to protect the nodes 110, 120, 130 from collisions first, and then to adjust to prevent communications interference.

Figure 4A:
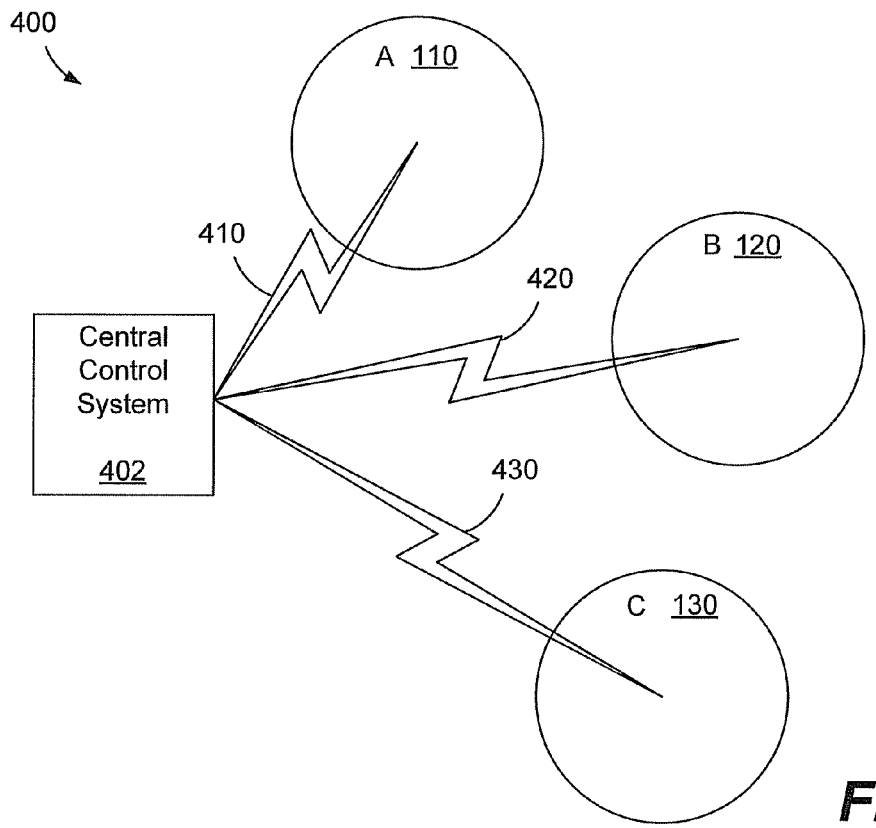
FIGS. 4A and 4B are diagrams of systems where the plurality of agents of FIG. 2 communicate information to allow for trajectories to be determined for each of the plurality of agents.
Figure 4B:
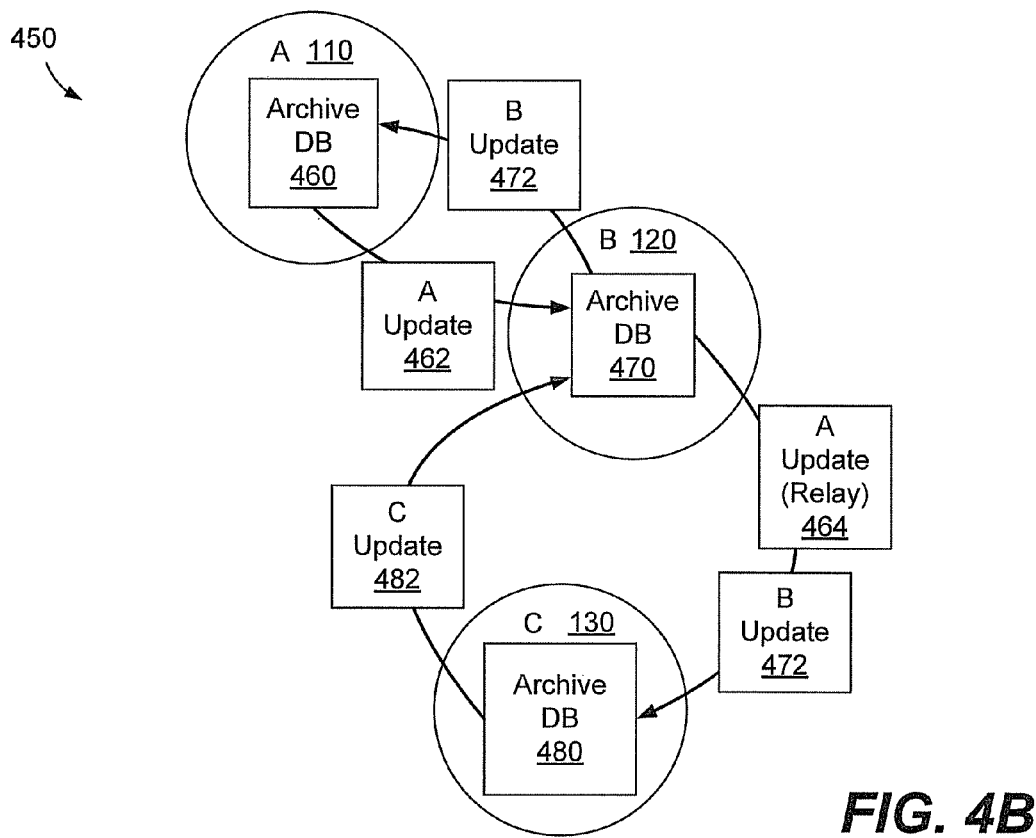

FIGS. 4A and 4B are diagrams of various embodiments of systems 400 and 450 where the plurality of agents 110, 120, 130 of FIG. 2 communicate information to allow for trajectories to be determined for each of the plurality of agents 110, 120, 130. FIG. 4A shows an embodiment of a system 400 in which the agents 110, 120, 130 are directed by a central control system 402. In the system 400, the agents 110, 120, 130 exchange telemetry 410, 420, 430, respectively, with the central control system 402. The telemetry 410, 420, 430 sent by each of the agents 110, 120, 130 provides information to the central control system 402 about the position of each of the agents and other operating conditions monitored by the agents 110, 120, 130. In turn, the central control system 402 re-computes potential fields for the agents 110, 120, 130 and directs the agents 110, 120, 130 to move to account for changes in the potential fields.

FIG. 4B shows another embodiment of a system 450 in which the agents 110, 120, 130 compute and maintain local archive databases 460, 470, 480, respectively, storing data regarding each of the agents 110, 120, 130. Given information about the goals of the shared operation for each of the agents 110, 120, 130 and parameters that determine the potential fields for each of the agents 110, 120, 130 in the local archive databases 460, 470, 480, each of the agents 110, 120, 130 can re-compute their own trajectories and those of the other agents 110, 120, and 130. By re-computing the trajectory for itself and the trajectories for others of the agents 110, 120, 130, each of the agents 110, 120, and 130 can re-compute potential fields for all of the agents 110, 120, and 130. As a result, each of the agents 110, 120, 130 can direct itself to observe the constraints of the potential fields for the system of agents 110, 120, 130.

In order to maintain local archive databases 460, 470, 480, the agents 110, 120, 130 may transmit updates to each other. Not every agent may directly communicate with all of the other agents 110, 120, 130, but each of the agents may communicate with each of the other agents 110, 120, 130 using one or more of the other agents as intermediaries. Each of the agents 110, 120, 130 may relay updates received from other agents. For purposes of the example of FIG. 4B, it is assumed that Agent B 120 is in communication range of Agent A 110 and Agent C 130, but that Agent A 110 and Agent C 130 are not in communication range of each other. Agent A 110 transmits an update 462 to Agent B 120 to update Agent B 120 and other agents on its position and to update other operating parameters. Agent B 120 transmits an update 472 to Agent A 110 and to Agent C 130. Agent B 120 also sends a relay 464 of the update 462 from Agent A 110 to Agent C 130. Agent C 130 sends an update 482 to Agent B 120 that Agent B 120 relays to Agent A 110 (not shown). Upon receiving updates 462, 464, 472, 482 from others of the agents 110, 120, 130, each of the agents 110, 120, 130 stores the information included in the updates 462, 464, 472, 482 in their respective local archive databases 460, 470, 480. Then, using the updated information stored in the local archive databases 460, 470, 480, the agents 110, 120, 130 may recalculate potential fields to control their operations to observe the constraints imposed on the system 450 of agents 110, 120, 130 modeled by the potential fields.

Two operational details should be noted about the systems 400 and 450. First, telemetry with a central control system 402 (FIG. 4A) and updates exchanged between agents 110, 120, 130 (FIG. 4B) are not transmitted continually. According to a particular illustrative embodiment, the agents 110, 120, 130 may be configured to transmit updates based on the occurrence of predetermined discrete events. For example, the agents 110, 120, 130 may be configured to transmit updates upon receiving updated data from another of the agents 110, 120, 130 when one of the other agents reports operational considerations potentially affecting dynamics or communication capabilities of the reporting agent, such as the reporting agent has malfunctioned or has encountered an external condition that it cannot overcome. An update may be sent after passage of a specified time interval. An update may be sent when a predetermined time has been reached. An update may be sent when an agent 110, 120, 130 has reached a predetermined position.

In addition, an update may be sent when one of the agents 110, 120, 130 identifies that a predetermined value of an external condition has been reached, such as a certain ambient temperature or that a certain altitude has been reached. An update may be sent when one of the agents 110, 120, 130 identifies that a predetermined value of an operational parameter has been reached, such as a certain communication signal strength condition. An update also may be sent upon receiving an extrinsic command from an external command source. This list of predetermined discrete events is illustrative, but not limiting. Other predetermined discrete events may result in the communication of updates between agents 110, 120, 130.

According to an illustrative embodiment, the predetermined discrete events may be dynamically re-determined. For example, when agents 110, 120, 130 are configured to send updates upon reaching a predetermined position, if conditions cause the agents 110, 120, 130 to progress more slowly than anticipated, the predetermined positions that trigger updates may be recomputed. Similarly, if communication signal strength parameters are less than anticipated, updates may be sent after the passage of shorter periods of time so that communications between agents 110, 120, 130 is maintained.

Second, according to a particular illustrative embodiment, the agents 110, 120, 130 may support two different communication systems. For example, if the agents 110, 120, 130 are communication nodes used to create a communication system, the agents 110, 120, 130 may maintain a first communication system used for communication of updates as described with reference to FIG. 4B. The first communication system used for updates may be separate from a second communication system that the agents 110, 120, 130 deploy for the benefit of other systems and users. Alternatively, the agents 110, 120, 130 may support only a single network. Using a single network, the agents 110, 120, 130 transmit updates to other agents using packets that are sent between packets of other data carried across the network formed by the agents 110, 120, 130.

FIG. 5 a diagram of an environment 500 in which a plurality of agents proceed to a specified goal 140 through a course including boundaries 520, 522, terrain changes 530, atmospheric issues 540, and one or more obstacles 550. As previously described, the agents 110, 120, 130 may be tasked with moving toward a specified goal 140. As described with reference to FIGS. 2A-2B, the agents 110, 120, 130 may stop upon reaching the goal 140, may circle the goal 140, or engage in another form of end behavior. The agents 110, 120, 130 may act based on transmissions 502 from an external control source 402 as described with reference to FIG. 4A or the agents 110, 120, 130 may act autonomously as described with reference to FIG. 4B. Alternatively, the agents 110, 120, 130 may act autonomously but may be programmed by the external control source 402 and be subject to changed instructions sent via transmissions 502 from the external control source 402 that may change constraints reflected in the potential fields, change the specified goal 140, abort the shared operation, or change other parameters.

In the process of reaching the specified goal 140, the agents 110, 120, 130 may encounter and have to adjust for unforeseen or changing conditions to observe the constraints modeled by assigned potential fields. The agents 110, 120, 130 may have to navigate between boundaries 520, 522 that may force the agents 110, 120, 130 to adjust their courses to avoid collisions with the boundaries 520, 522 or with others of the agents 110, 120, 130. The agents 110, 120, 130 also may have to adapt for terrain changes 530 that impede or possibly aid the movement of the agents 110, 120, 130. The terrain changes 530 may represent changes in ground-based terrain, underwater terrain, or conditions caused by changing atmospheric layers. Terrain changes 530 that affect movement of the agents may, for example, require the agents to change course to avoid some terrains or to adjust the velocities or trajectories of the agents 110, 120, 130 to maintain communications while navigating through the terrain changes 530. The agents 110, 120, 130 may have to adjust for atmospheric issues 540, such as wind, current, or other changes. Gusting winds or shifting currents may involve an increased minimum collision avoidance range or possibly may reduce a maximum communications range that affects computation of the potential fields.

The agents 110, 120, 130 also may adjust for the presence of one or more obstacles, such as obstacle 550. The obstacle 550 may include any type of object that may interfere with operation of, movement of, or communications between the agents 110, 120, 130. For example, the obstacle 550 may include a physical object, such as an outcropping of rock or a body of vegetation. The obstacle 550 also may include an electromagnetic field source that might interfere with the operation of or communications between the agents 110, 120, 130. The obstacle 550 also may include a thermal source, such as a vent or a spring that might adversely affect an operating temperature of the agents 110, 120, 130. In any case, the agents 110, 120, 130 may have to adjust for the presence of obstacles to observe the constraints represented by assigned potential fields.

Figure 6:
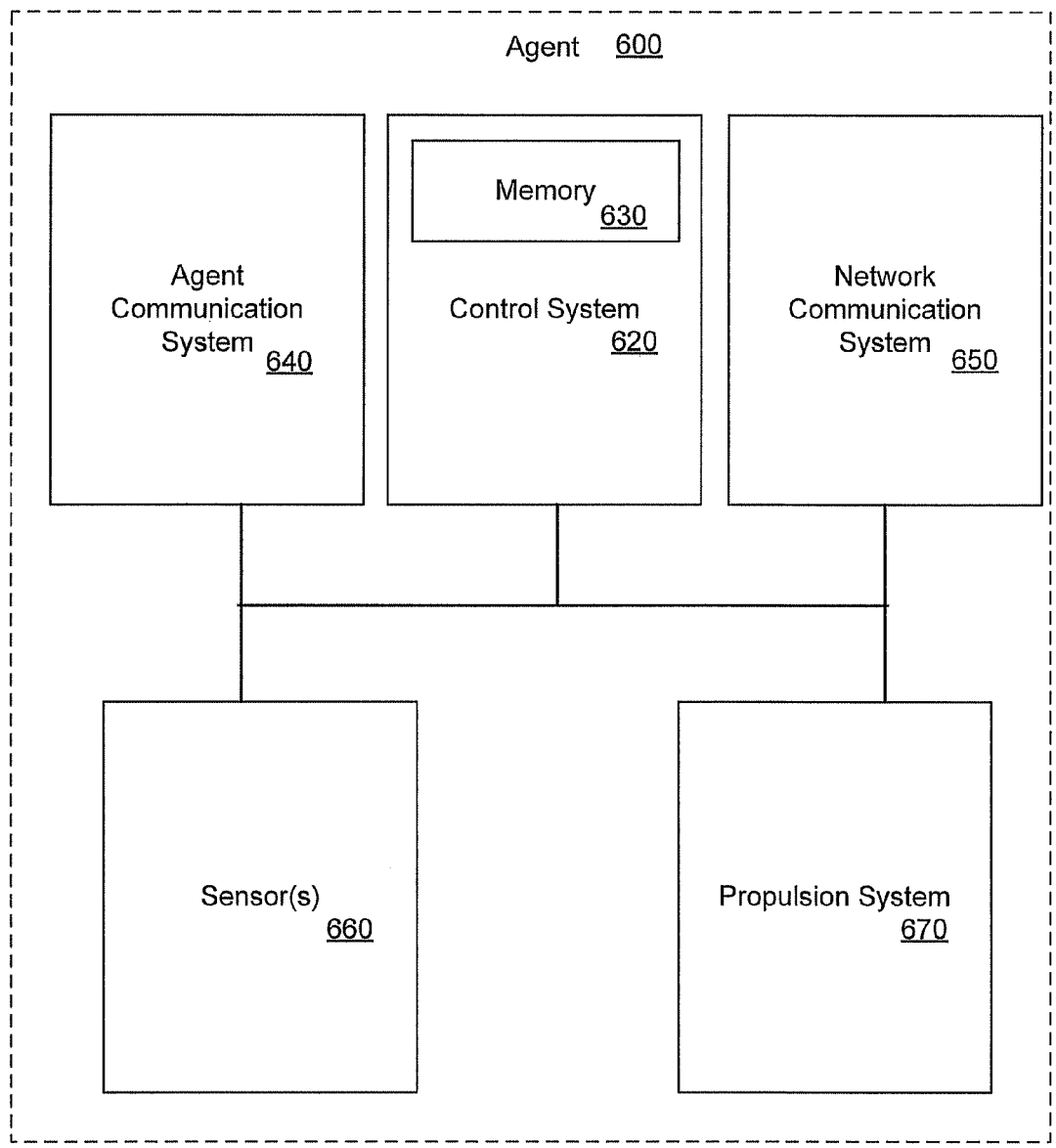
FIG. 6 is a block diagram of a representative agent.

FIG. 6 is a block diagram of a representative agent 600. The agent 600 may be a self-deploying robotic agent or the agent 600 may be a system that provides direction to a human operator. The agent 600 includes a control system 620 that, for example, may include a general purpose computing system as described with reference to FIG. 21 adapted for controlling the agent 600. Alternatively, the control system 620 also may include a special purpose computing system adapted for controlling the agent 600. The control system 620 may support a memory 630 or other storage configured to maintain operating instructions for the agent 600, such as the specified goal of the shared operation, the constraints to be modeled by assigned potential fields, and operating programming. The memory 630 also may be used to store instructions received from an external control source 402 (FIGS. 4A and 5) or updates from others of the agents 110, 120, 130 (FIG. 4B).

According to particular embodiments, the agent 600 may support one or more communication systems 640 and 650. As previously described with reference to FIG. 4B, a group of agents may maintain one communication system, such as an agent communication system 640 that is used to communicate with other agents and with an external control source 402. When the agent 600 is to serve as a node in a communications network, the agent 600 also may include a network communication system 650 that is used to support communication between devices and users of the network deployed through the use of the agent 600. Alternatively, as also previously described with reference to FIG. 4B, the agent 600 may maintain a single communication system that is used for both control communications between agents and to conduct communications between external devices and users.

According to a particular embodiment, the agent 600 may support one or more sensors 660. The sensors 660 may be used to monitor the operation of the agent 600, for example, to monitor the power reserves and operating parameters of the agent 600, to monitor external conditions that identify boundaries 520, 522, terrain changes 530, atmospheric issues 540, and obstacles 550 (FIG. 5). The sensors 660 also may monitor communication conditions that may affect the communication systems 640 or 650, or communication conditions may be monitored by the communication systems 640 and 650 themselves.

The agent 600 also may include a propulsion system 670. The agent 600 may be a ground-based agent that includes a ground-based propulsion system. Alternatively, the agent 600 may be configured to operate in water or may be configured to fly over a surface. The agent 600 may include any type of propulsion system configured to move the agent 600 over a trajectory or to allow the agent 600 to hover or float in a predetermined location. Alternatively, the agent 600 may not include a propulsion system. The agent 600 may be a stationary agent, such as a fixed communications relay station or communications buoy that, once deployed, remains in place. It will be appreciated that even if the agent 600 is stationary, the agent 600 still may use potential fields and communicate with other agents with regard to parameters that affect the potential fields for the agents in the group. For example, a stationary agent may communicate with other agents regarding separation constraints so that a group of agents observes the constraints modeled by the assigned potential fields. As another example, a stationary agent may also communicate with other agents regarding parameters that affect parameters that do not involve motion or physical position, but that affect other operational functions, such as communication signal strength and communication directionality such as achieved with phased array antennae. Thus, application of potential fields is applicable to both moving and stationary agents, The illustrative operation of the potential fields will be described in detail. In coordinating the behavior of a plurality of agents, which may include a plurality of communication nodes, a plurality of aircraft, a plurality of agents, etc., potential field methods are employed. In implementing potential field methods, a dynamic model is assigned to the group. For example, the vector of generalized coordinates for the two-dimension positions of n agents may be given by Eq. (1): (1)

$$p(p_{1x}, p_{1y}, p_{2x}, p_{2y}, \ldots, p_{nx}, p_{ny}) \tag{1}$$

To apply field potentials to the agents, a dynamic model characterizing behavior of the plurality of agents is assigned, where the dynamic model may be given by Eq. (2):

$$M\ddot{p}=\Gamma \qquad (2)$$

In Eq. (2), $\Gamma$ is a 2n dimension vector of generalized forces applied to the group, M multi-agent group 2n×2n diagonal matrix of agent masses, and $\ddot{p}$ is the 2n vector of agent accelerations. The model of Eq. (2) enables agents to be treated as physical objects subject to generalized forces. The generalized forces may be translated into trajectories by numerical integration as given by Eq. (3):

$$\ddot{p}_{des} = M^{-1}\Gamma$$
$$\dot{p}_{des} = \dot{p}_0 + \int_0^{\Delta t} \ddot{p}_{des} d\tau \qquad (3)$$
$$p_{des} = p_0 + \int_0^{\Delta t} \dot{p}_{des}(\tau) d\tau$$

In Eq. (3), $p_o$ and $\dot{p}_o$ represent the current generalized position and velocity trajectories, respectively, and $p_{des}$, $\dot{p}_{des}$, and $\ddot{p}$ des represent the estimated output trajectories or output trajectories of the agents.

A task criterion in the framework defines a function from 2n agent coordinates to m task coordinates. The task coordinates are chosen to represent functional quantities as part of the desired action. An m dimensional task with coordinates is represented as given by Eq. (4):

$$x \triangleq \langle x_1, x_2, \ldots, x_m \rangle \qquad (4)$$

In Eq. (4), each set of coordinates $x_n$ is defined as a transformation T on a position p, i.e., $x=T[p]$.

A differential representation involving a group-wide Jacobian transformation of task coordinates, i.e., $J=\partial x/\partial p$, is associated to create task forces derived from the potential field and apply them on the agent actuators. Based on the principle of virtual work, forces that produce work in systems in motion may be translated into generalized forces using a duality given by Eq. (5):

$$\Gamma = J^T F \qquad (5)$$

In Eq. (5), F is a control force that may be used to optimize gradient descent policy.

Potential fields, as applied in a particular illustrative embodiment, are defined as quadratic functions such as given by Eq. (6):

$$V_{criterion} \triangleq \|x - x_{des}\|^2 \qquad (6)$$

An objective is to develop control policies that minimize the potential field and thus satisfy the previously established criteria. To that end, the criteria x are related to the forces F associated with the potentials by developing a dynamic model of task behavior. Left-multiplying Eq. (2) by $JM^{-i}$ yields $J\dot{p}=JM^{-i}\Gamma$. Using Eq. (5) yields the dynamic equation given by Eq. (7):

$$\Lambda \ddot{x} + \mu = F \qquad (7)$$

In Eq. (7), $\Lambda \triangleq (JM^{-i}J^T)^{-1}$ may be used as a mass/inertial factor and $\mu \triangleq J\dot{p}$ so as to be analogous to a Coriolis/centrifugal velocity. In view of Eq. (7), the choice of the control policy F enables the ability to instantaneously guide the task toward a specified goal.

According to a particular embodiment, $\ddot{x}$ may be controlled to achieve the goal established by the potential field. Combining Eq. (5) and Eq. (7), the control equation is given by Eq. (8):

$$\Gamma = J^T(\Lambda F^* + \mu) \qquad (8)$$

In Eq. (8), $F^*$ is a desired control law that implements the potential field. Thus, a resulting linear feedback control is given by Eq. (9):

$$\ddot{x} = F^* \qquad (9)$$

To cause the task field to converge, proportional derivative control laws are achieved by performing a closed-form gradient descent on the potential field.

To combine multiple objectives, K independent fields are defined where each field characterizes a simple stand-alone goal.

According to a particular illustrative embodiment, a prioritized architecture is used in which multidimensional systems address redundancy by imposing priorities between the control fields.

According to a particular embodiment, groups of agents, including agents or other agents, are treated as multi-dimensional systems. The prioritized architecture is used to resolve the multi-agent problem. Priorities are used as a mechanism to temporarily override certain non-critical fields in order to fulfill critical constraints. In this approach, fields are ordered according to their relative importance in the safe and successful accomplishment of the instantaneous actions. This methodology may be used to solve the problem of coordinating large numbers of agents. By designing behaviors that assign high priority to geographical and network enforcement fields, these may be satisfied while accomplishing the mission goals.

To establish priorities between fields, a prioritized control structure may be defined as given by Eq. (10):

$$\Gamma = \Gamma_1 + \Gamma_{2|1} + \Gamma_{3|2|1} + \ldots + \Gamma_{P_K} = \sum_{j=1}^{K} \Gamma_{P_j} \qquad (10)$$

In Eq. (10), the piped notation i|j| indicates a prioritized ordering from left to right. Also in Eq. (10), $P_j \triangleq \{j|j-1|\ldots|1\}$ is the prioritized ordering of the $j^{th}$ priority level, and $\Gamma_{P_j}$ represents the projection of the generalized forces of the $j^{th}$ field onto a null space of higher priority fields. The control structure for a given field is given by Eq. (11) where the value of $J_{P_j}$ is given by Eq. (12):

$$\Gamma_{P_j} \triangleq J_{P_j}^T F_{P_j} \qquad (11)$$

$$J_{P_j} \triangleq J_j N_{P_j} \qquad (12)$$

$J_{P_j}$ is the prioritized Jacobian of the $j^{th}$ field and $N_{P_j}$ is the prioritized null-space associated with all higher priority fields.

To demonstrate that Eq. (11) provides desired decoupling behavior, the dynamic equation of each field is determined and their mutual coupling is studied. Similar to the manipulation of Eq. (7), left-multiplying Eq. (2) by $J_{P_j}M^{-1}$ yields the dynamic equation given by Eq. (13):

$$\ddot{x}_{P_j} - J_{P_j}\dot{h}_j = J_{P_j}M^{-1}\Gamma \qquad (13)$$

To design controllers that optimize the gradient descent of the potential fields, control structures are chosen of the form of Eq. (14) where the value of $\Lambda_{P_j}$ is given by Eq. (15):

$$\Gamma_{P_j} = J_{P_j}^T \left( \Lambda_{P_j} F_{P_j}^* + \mu_{P_j} - \Lambda_{P_j} J_{P_i} M^{-1} \sum_{l=1}^{j-1} \Gamma_{P_l} \right) \quad (14)$$

$$\Lambda_{P_j} \triangleq = (J_{P_j} M^{-1} J_{P_j}^T) \quad (15)$$

$\Lambda_{P_j}$ is a prioritized mass matrix. $(.)^+$ represents the Moore-Penrose pseudoinverse, and $\mu_{P_j}$ is a prioritized Coriolis/centrifugal factor.

Substituting Eq. (14) into Eq. (13) via Eq. (10), a decoupled set of linear behaviors is obtained, as given by Eq. (16):

$$\forall j, \ddot{x}_{P_j} = F^*_{P_j} \quad (16)$$

The decoupled set of linear behaviors is used to implement feedback controllers that optimize the desired gradient descent policies for the objectives.

The derived behaviors are workable when all of the agents, whose situation is represented by one of the potential fields, can reach their goals. Allowances may have to be made when two or more fields have conflicting goals.

Figure 7:
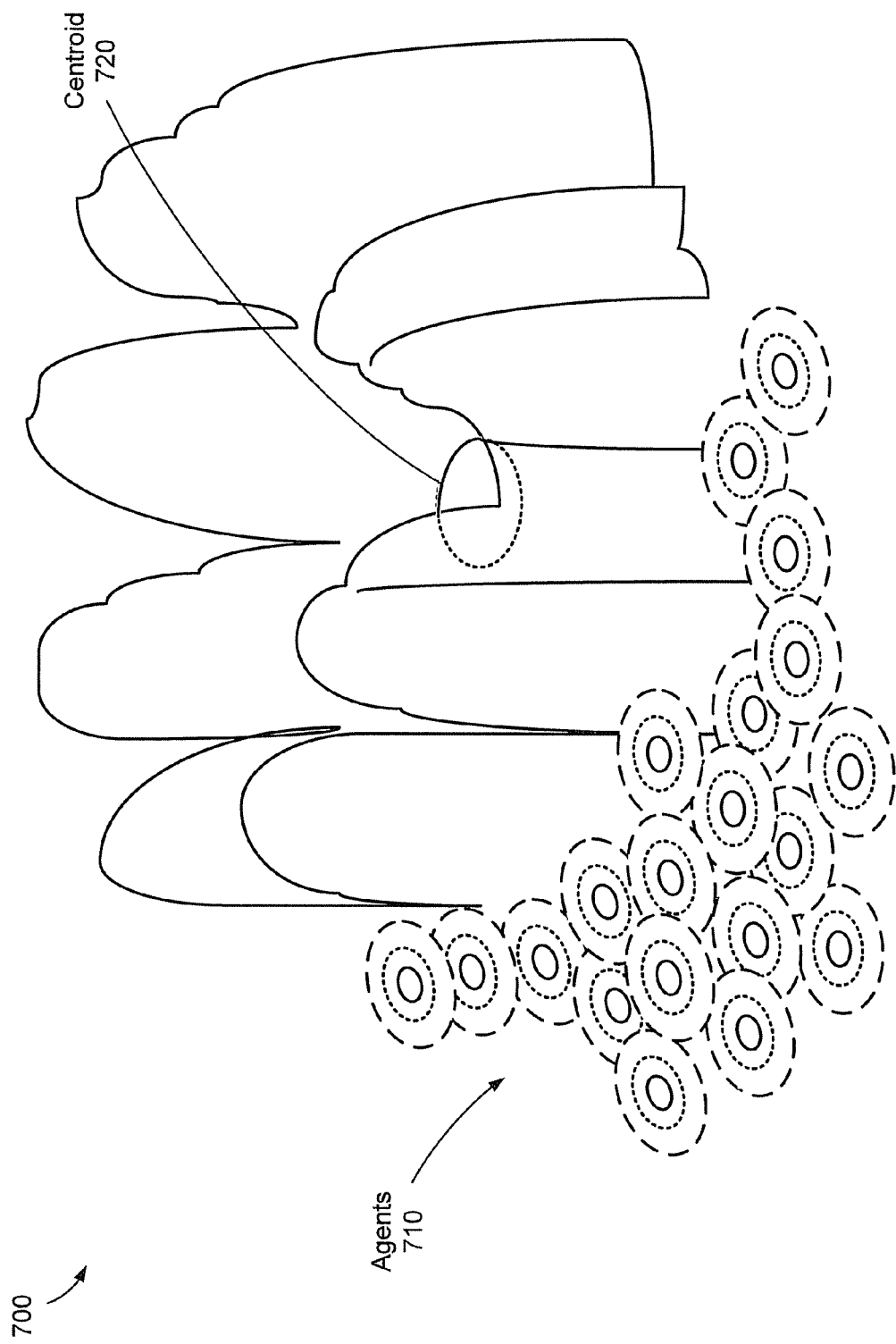
FIG. 7 is a diagram of an environment 700 in which potential fields result in operational conflict.

FIG. 7 is a diagram of an environment 700 in which potential fields result in operational conflict. For example, a field imposing network separation constraints can conflict with a field that attracts agents 710 to a geometric centroid 720, as illustrated in FIG. 7. In such a case, ordinarily a higher control priority would be assigned to the network constraint because the network constraint guarantees communication at all times. During conflicting scenarios, higher priority fields leave too few degrees of freedom available for the full execution of low priority fields, and the low priority fields are considered only partially feasible. In the representation given in Eq. (12), this situation occurs if the null-space matrix $N_{P_j}$ does not span the lower priority field coordinates represented by $J_i$. In turn, a prioritized Jacobian $J_{P_j}$ becomes ill conditioned causing the mass matrix given in Eq. (15) to become singular.

The singular value decomposition of the term of the prioritized mass matrix of Eq. (15) is given by Eq. (17):

$$J_{P_j} M^{-1} J_{P_j}^T = [U_r \ U_n] \begin{bmatrix} \sum_r & 0 \\ 0 & 0 \end{bmatrix} \begin{bmatrix} U_r^T \\ U_n^T \end{bmatrix} \quad (17)$$

In Eq. (17), $U_r$ and $U_n$ are eigenvectors that span rank and null kernels and $\rho_r$ are non-zero eigenvalues. Substituting the result of Eq. (17) into Eq. (15) reduces the value of $\Lambda_{P_j}$ as given by Eq. (18):

$$\Lambda_{P_j} = U_r \sum_r^{-1} U_r^T \quad (18)$$

Combining Eq. (14) with Eq. (13) by means of Eq. (10) yields a set of partially controlled dimensions given by Eq. (19):

$$U_r^T (\ddot{x}_{P_j} = F^*_{P_j}) \quad (19)$$

Because $U_r$ corresponds to the rank eigenspace, Eq. (19) achieves a linear mapping within the controllable directions. As a result, the potential field acts in the subspace of $U_r$ descending the gradient optimally until it reaches the minimum energy within that space.

According to a particular embodiment, action primitives are used to encapsulate multiple criteria for executing meaningful group behaviors. An action primitive defines a complete ordering in which more critical objectives take precedence over less important objectives. The criteria are represented by reactive control fields with three types of parameters, including coordinates, goals, and control policies.

For example, one potential action primitive is an "exploration primitive" used to coordinate an exploration mission in a complex geographical environment. Table (1) lists six criteria incorporated in the exploration primitive that characterize the design specifications for the exploration example:

TABLE 1

| Control Field | Coordinates | Priority |
| --- | --- | --- |
| Obstacle Avoidance | Distance to obstacles | 1 |
| Network Topology | Distance between agents | 2 |
| Network Graph | Distance between clusters | 3 |
| Goal Pursuit | Distance from centroid to goal | 4 |
| Formation | Formation coordinates | 5 |
| Friction | Generalized coordinates | 6 |

According to a particular illustrative embodiment, the fields to which the highest priorities are assigned concern preserving the group and maintaining network connectivity. Thus, as indicated in Table (1), the highest priorities are assigned to Obstacle Avoidance, Network Topology, and Network Graph. Succeeding in reaching an ultimate object, represented by the Goal Pursuit field, is assigned a next highest priority. A simple criterion for controlling the group's centroid will naturally result in agent distributions that comply with network and geographical constraints. After the Goal Pursuit field, a next to last priority is assigned to a Formation field that optimizes geometry of a formation of agents by monitoring and managing residual redundancy of the agents. A lowest priority in the present example is assigned to a Friction field that is used to dampen uncontrolled modes. The fields are explained in more detail below.

The Obstacle Avoidance field is directed to ensuring that agents react to geometric constraints in the terrain or other environment that the agents confront. The coordinates defining the Obstacle Avoidance field are represented as given by Eq. (20):

$$x = [\ldots d_{ij} \ldots] \quad (20)$$

A distance from an agent i to a perimeter of an obstacle (obs) is represented as given by Eq. (21):

$$d_{i,obs} \triangleq \|p_i - p_{obs,i}\| \quad (21)$$

The Obstacle Avoidance field operates on the principle of repulsion effected by repulsion goals represented as given by Eq. (22):

$$d_{ij,des} = r_i + d_{away} \quad (22)$$

In Eq. (22), $d_{des}$ is a desired distance for a center of the agent i to be from the obstacle where $r_i$ is the radius of the agent i and $d_{away}$ is a predetermined safe distance for the agent to be from the perimeter of the obstacle. To control the Obstacle Avoidance field effectively, an activation threshold $d_{close}$ is set to specify when agents are too close to the obstacle such that $d_{away} > d_{close}$. Causing the agent to remain beyond the activation threshold $d_{close}$ prevents agents from permanently bonding the agent to the obstacle.

One way to position the agent i away from the obstacle is to cause the agent to be repelled in a direction of a distance vector between the agent and the obstacle. Another preferable approach is to add a tangential component to the avoidance field in the direction of the flow toward a goal such that the agent is repulsed away from the obstacle along a course that will drive the agent toward its intended goal.

The Network Topological field prevents agents from violating proximity conditions that result in communication interference between agents. The Network Topological field applies repulsion forces between pairs of agents within a specified proximity of one another. An activation threshold for the Network Topological field is defined based on network communication specifications, which may vary for different agents. A repulsion goal is imposed on every pair of agents within a specified range of one another.

Coordinates defining the Network Topological field are given by Eq. (23):

$$x=[\ldots d_{ij} \ldots] \quad (23)$$

Eq. (23) is similar to Eq. (20) for the Obstacle Avoidance field except that, instead of representing a distance to an obstacle, $d_{ij}$ represents distances between close pairs of agents, as given by Eq. (24):

$$d_{ij} \triangleq \|p_i - p_j\| \quad (24)$$

The Network Topological field operates on the principle of repulsion between agents with repulsion goals given by Eq. (24):

$$d_{ij,des} = r_i + r_j + d_{push} \quad (25)$$

In Eq. (25), $r_i$ and $r_j$ are the radii of the agents in the pair of agents to be repulsed from each other and $d_{push}$ is a predetermined distance between the agents that will enable communications between the agents free of effects of being too close to each other. To control the Network Topological field effectively, $d_{push} > d_{interference}$, where $d_{interference}$ is the threshold that determines when a pair of agents is too close such that interference would result from the proximity of the two agents.

The Network Connected Graph field imposes a condition that there be at least one path of communication links between any two agents in the network.

Figure 8:
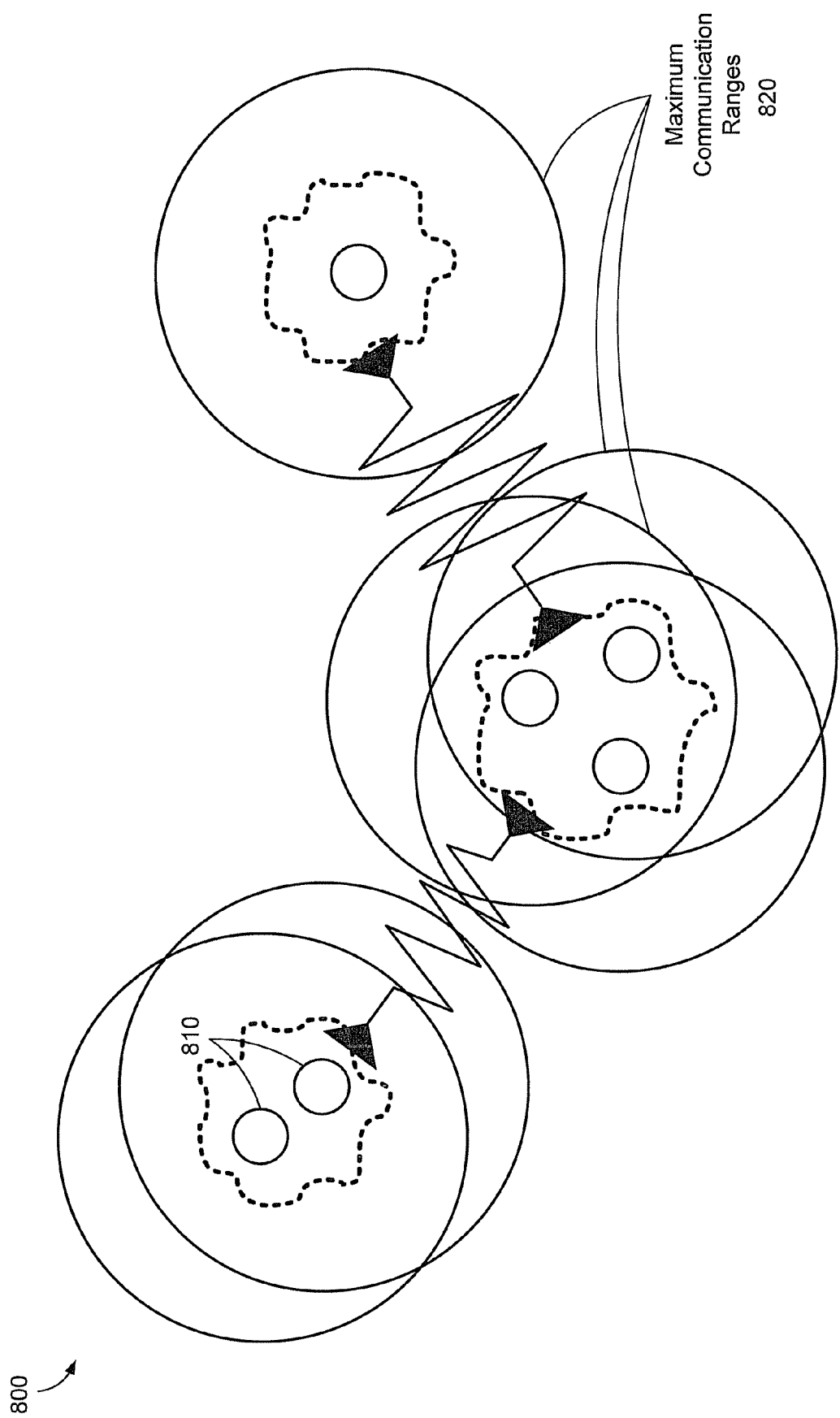
FIG. 8 shows a network enforcement field used to identify at least one communication path between each of a plurality of agents in a network of agents.

FIG. 8 shows a network enforcement field 800 used to ensure the existence of at least one communications path between each of a plurality of agents in a network of agents 810. According to one embodiment, a communication network of agents is represented using an undirected, weighted graph. A communication threshold, $d_{range}$, is defined to monitor when agents are nearing the limits of communication range 820. A predetermined, desired optimal communication distance between neighboring agents, $d_{optimal}$, is established. Each agent 810 in the Network Connected Graph field represents a cluster of agents that form a connected sub-network with communication links no greater than $d_{range}$. Between each pair of agents, an edge is created with a weight equal to the distance between neighbors. The goal is to attract the agents to each other so that none of the edges between the agents exceed $d_{range}$. A minimum spanning tree (MST) algorithm is applied to the Network Connected Graph to minimize a length of a longest edge. In minimizing the length of the longest edge, the MST assures that the entire group of agents is reconfigured in a minimal time.

A Network Connected Graph field is defined that imposes attraction forces between each of the agents. The Network Connected Graph field includes coordinates for each pair of agents that are joined in the MST. For each pair of attracted agents, i and j, $d_{ij}$ represents a distance between the agents. The coordinates of agents in the Network Connected Graph field is given by Eq. (26):

$$x=[\ldots d_{ij} \ldots] \quad (26)$$

The distance between agents d also may be represented as given by Eq. (27):

$$d_{ij} \triangleq \|p_{i^*} - p_{j^*}\| \quad (27)$$

In Eq. (27), $d_{ij}$ represents the distance between the closest pair of agents $i^*$ and $j^*$ in each agent. The field operates based on the principle of attraction with attraction goals as given by Eq. (28):

$$d_{ij,des} = d_{optimal} \quad (28)$$

When the agents exceed $d_{range}$, the Network Connected Graph field becomes active so as to cause the agents to attract each other before a breach opens in communication ranges that would sever any of the paths between agents.

A Goal Pursuit field is used to maneuver a group of agents around the terrain or other geography of the zone in which the agents operate. The Goal Pursuit field uses only a single coordinate x to represent the distance from the group's geometric centroid, where a desired distance to the geometric centroid is $p_{goal}$. The coordinate defining the field is given by Eq. (29):

$$x = \|p_{cog} - p_{goal}\| \quad (29)$$

The field operates on a principle of attraction with an attraction goal $x_{des}$ given by Eq. (30):

$$x_{des} = 0 \quad (30)$$

As the desired centroid represented by the Network Connected Graph field is moved, the constraint fields provide that the group locally adapts to geometric and network changes.

A Formation field is used to distribute agents in geometric topologies. A principle underlying the Formation field is to enhance group performance measured according to a specified metric. For example, to maximize the area swept in an exploration mission, a circle formation field may be used.

FIG. 9 shows a circle formation field 900 used to align agents 910 as a result of assigned potential fields. Using the circle formation field 900 uniformly distributes agents 910 around a geometric centroid 920 of the agents 910 where the agents 910 surround the geometric centroid 920 at a maximum possible radius. The coordinates defining the Formation field are given by Eq. (31):

$$x=[\ldots \|p_i - p_{circle,i}\| \ldots] \quad (31)$$

In Eq. (31), $$p_{circle,i} = p_{cog} + \gamma_{circle}\left[\cos\frac{1}{2\pi n} \sin\frac{i}{2\pi n}\right]$$

is chosen such that each agent positions itself to a closest point on the circumference. A value of $\gamma_{circle}$ may be computed offline based on a number of agents participating in the shared operation and optimal network ranges between agents. The Formation field operates on a principle of attraction where the attraction goal is given by Eq. (32):

$$x_{i,des} = 0 \quad (32)$$

The Friction field is designed to dampen uncontrolled modes. Coordinates defining the Friction field are the generalized agent coordinates given by Eq. (33):

$$x = [p_{1,x} p_{1,y} \cdots p_{n,x} p_{n,y}] \quad (33)$$

An object of the Friction field is to minimize the uncontrolled movement of the agents while pursuing higher priority objectives. The Friction field operates on the velocities $\dot{x}$ by imposing a damped behavior given by Eq. (34):

$$\ddot{p}_{i,des} = 0 \quad (34)$$

Eq. (34) causes each agent to decrease velocity in any uncontrolled directions.

FIG. 10 is a diagram of a system 1000 including different types of communication agents 1010, 1020, 1030, 1040 that may support a communication network. The system 1000 may include one or more ground-based communication agents 1010. The ground-based communication agent 1010 may be a stationary agent that remains in a single position on the ground 1012 or the ground-based communication agent 1010 may be a mobile agent that moves over the ground 1012. The system 1000 may include one or more air-based communication agents 1020 that move through or hover in the air 1022 or another atmosphere. The system 1000 also may include one or more water-based communication agents 1030, 1040 that operate on or in water or another fluid. The system 1000 includes a water-based communication agent 1030 that operates on a surface 1034 of the water 1032 and a water-based communication agent 1040 that operates beneath the surface 1034 of the water 1032. The water-based communication agents 1030, 1040 may include stationary buoys or agents that are capable of movement over or through the water 1032. The system 1000 may use any or all of these agents 1010, 1020, 1030, 1040 to create a communications network that spans an area over ground 1012 and water 1032. The system 1000 may enable communication between stations and vehicles based on the ground 1012, vehicles in the air 1022, or stations or vehicles above the surface 1034 or under the surface 1034 of the water 1032.

Figure 11B:
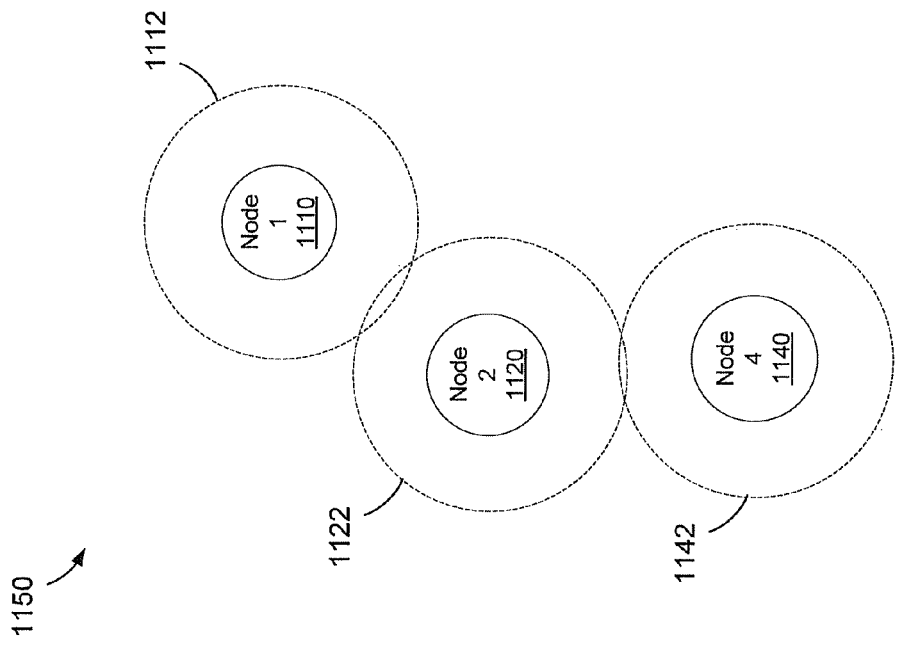
FIGS. 11A and 11B show a system of communication nodes that are reconfigured to continue to provide communication coverage when a communication node fails.
Figure 11A:
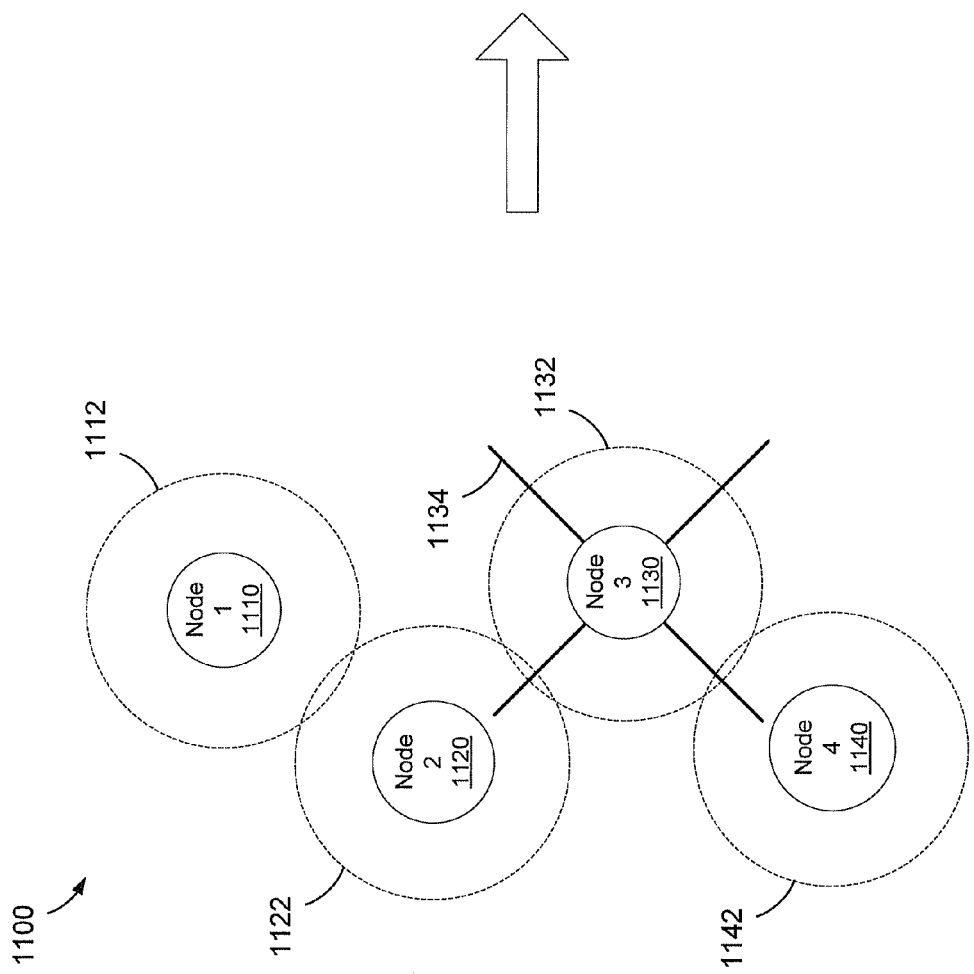

FIGS. 11A and 11B show systems 1100, 1150 of communication nodes 1110, 1120, 1130, 1140 in which the communication nodes 1110, 1120, 1140 are reconfigured to continue to provide communication coverage when a communication node 1130 fails. Each of the communication nodes 1110, 1120, 1130, 1140 may be stationary or mobile nodes, as described with reference to FIG. 10. The mobile communication nodes may include self-deploying robotic agents configured to move themselves to a desired location to facilitate proliferation of a communication network supported by the plurality of communication nodes. Each of the communication nodes 1110, 1120, 1130, 1140 has a maximum communication range 1112, 1122, 1132, 1142 (minimum distances to prevent interference are not shown in FIGS. 11A and 11B). The communication nodes 1110, 1120, 1130, 1140 are positioned so that the maximum communication ranges 1112, 1122, 1132, 1142 of each of the communications nodes 1110, 1120, 1130, 1140 overlaps with at least one other maximum communication range of nodes 1110, 1120, 1130, 1140 to ensure a communication link between each of the communication nodes 1110, 1120, 1130, 1140.

As shown in FIG. 11A, Node 3 1130 has failed or reports an imminent failure (represented by an "X" 1134). Potential fields representing the communication ranges of the remaining nodes 1110, 1120, 1140 are recomputed upon realizing or assuming the failure of Node 3 1130 by removing Node 3 1130 from the system 1100. To maintain a communications link between the remaining communication nodes 1110, 1120, 1140, the positions or trajectories of the communication nodes 1110, 1120, 1140 are readjusted in response to the recomputed potential fields representing the communication ranges 1112, 1122, 1142 of the remaining communication nodes 1110, 1120, 1140.

FIG. 11B shows a result of the re-computation of the potential fields for the remaining communication nodes 1110, 1120, 1140. Some or all of the remaining communication nodes 1110, 1120, 1140 have moved so that the maximum communication ranges 1112, 1122, 1142 still overlap with at least one of the other maximum communication ranges 1112, 1122, 1142 of the remaining communication nodes 1110, 1120, 1140. The system may adapt for the loss or prospective loss of a communication node to provide coverage to at least a portion of the communication area to be served by the network serviced by the plurality of communication nodes. As a result, the remaining communication nodes 1110, 1120, 1140 continue to provide communication links across a system 1150 of the remaining communication nodes 1110, 1120, 1140.

FIGS. 12A and 12B show systems 1200, 1250 of aircraft 1210-1222 in a defined airspace 1202 where remaining aircraft 1210-1216 and 1220 are repositioned when some of the aircraft 1218, 1222 are removed from the defined airspace 1202. The defined airspace 1202 may represent an airspace assigned to a particular air traffic control zone such as may surround an airport with a control tower 1204 that manages takeoffs and landings at one or more runways 1206. According to illustrative embodiments of the present disclosure, based on telemetry with the aircraft 1210-1222, the control tower 1204 or another control source may receive telemetry from the aircraft, compute trajectories for the aircraft 1210-1222 to circle, approach, or land on the runway 1206 using potential fields, and transmit the trajectories to the aircraft 1210-1222. Alternatively, each of the aircraft 1210-1222 may communicate with others of the aircraft 1210-1222 and calculate the trajectories of all of the aircraft 1210-1222 to determine trajectories for each of the aircraft 1210-1222 to circle, approach, and land on the runway 1206. Using potential fields, the air traffic control of the aircraft 1210-1222 could be self-determined by the aircraft 1210-1222 independent of an external air traffic control system.

FIG. 12A shows a system 1200 in which seven aircraft 1210-1222 are present in the defined airspace. The aircraft 1210-1222 thus would be included on a monitored aircraft list that includes aircraft in the defined airspace 1202. Each of the aircraft 1210-1222 has a minimum separation distance 1230-1242, respectively, that may be modeled by potential fields assigned to the aircraft 1210-1222.

The potential fields for each of the aircraft 1210-1222 may be based in part on a present position of the aircraft and by dynamic properties, such as mass, airspeed, current acceleration, and other quantities that affect the motion of the aircraft. Each of the aircraft 1210-1222 is of a general type, including various types of propeller-powered and jet-powered aircraft. Each of the aircraft 1210-1222 also is of a specific type that is specified. For example, different types of commercial jet aircraft manufactured by The Boeing Company of Chicago, Ill., such as the 747 commercial jet aircraft, have different aerodynamic properties that significantly affect a minimum separation distance that is provided around the 747 aircraft as contrasted with, for example, 757 and 737 aircraft also manufactured by The Boeing Company.

The minimum separation distance 1230-1242 may be a two-dimensional area or a three-dimensional volume around each of the aircraft 1210-1222 that is not to be entered by others of the aircraft 1210-1222. As shown in FIG. 12A, the aircraft 1210-1222 are positioned so that none of the minimum separation distances 1230-1242 of the aircraft 1210-1222 overlap with the minimum separation distances 1230-1242 of any of the other aircraft 1210-1222. It should be noted that, in a particular embodiment, the minimum separation distances 1230-1242 of the aircraft 1210-1222, represented by the dotted lines in FIGS. 12A and 12B may overlap with each other provided that the aircraft 1210-1222 themselves do not encroach upon the minimum separation distances 1230-1242 of others of the aircraft 1210-1232.

The minimum separation distance 1230-1242 may vary for different types of aircraft. For example, small aircraft generally create less jet wash or cause less turbulence than larger aircraft. Further, some aircraft, as a result of the design of the aircraft, result in more surrounding turbulence than other aircraft of the same or larger size. Accordingly, in a particular embodiment, the aircraft type of each of the aircraft 1210-1222 should be considered in assigning and applying potential fields to model the minimum separation distance of the aircraft.

FIG. 12B shows a system 1250 in which two of the aircraft, Aircraft 5 1218 and Aircraft 7 1222 have been directed to land and thus have left the defined airspace 1202. According to a particular illustrative embodiment, just as potential field methods may be used to arrange the aircraft 1210-1222 at minimum separation distances, potential fields may be used to determine a landing solution of the aircraft 1210-1222. For example, based on a distance to the runway 1206, which also may be represented by a potential field, it may be determined which of the aircraft 1210-1222 should land first. Alternatively, potential field methods may consider other constraints that also may be represented by an assigned, potential field, such as a lack of fuel or rate of fuel consumption, in prioritizing the landing of the aircraft 1210-1222. In any event, once aircraft 1218 and 1222 have been removed from the defined airspace 1202 by landing or otherwise, potential fields modeling the minimum separation distance 1230-1242 may be reapplied to model a new positioning plan used to reposition the aircraft in the defined airspace 1202. As shown in FIG. 12B, the remaining aircraft 1210-1216 and 1220 may cluster closer to the runway as compared to when additional aircraft were present in the defined airspace 1202.

Figure 13B:
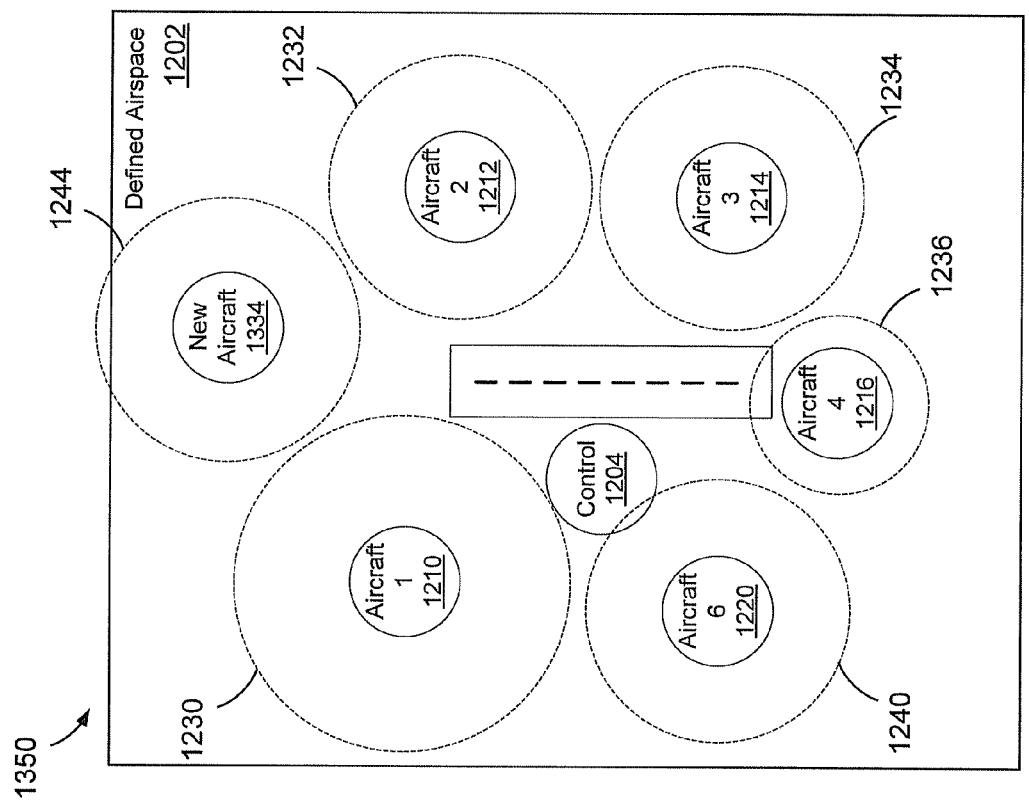
FIGS. 13A-13B show systems of aircraft being repositioned in the defined airspace when a new aircraft enters the defined airspace.
Figure 13A:
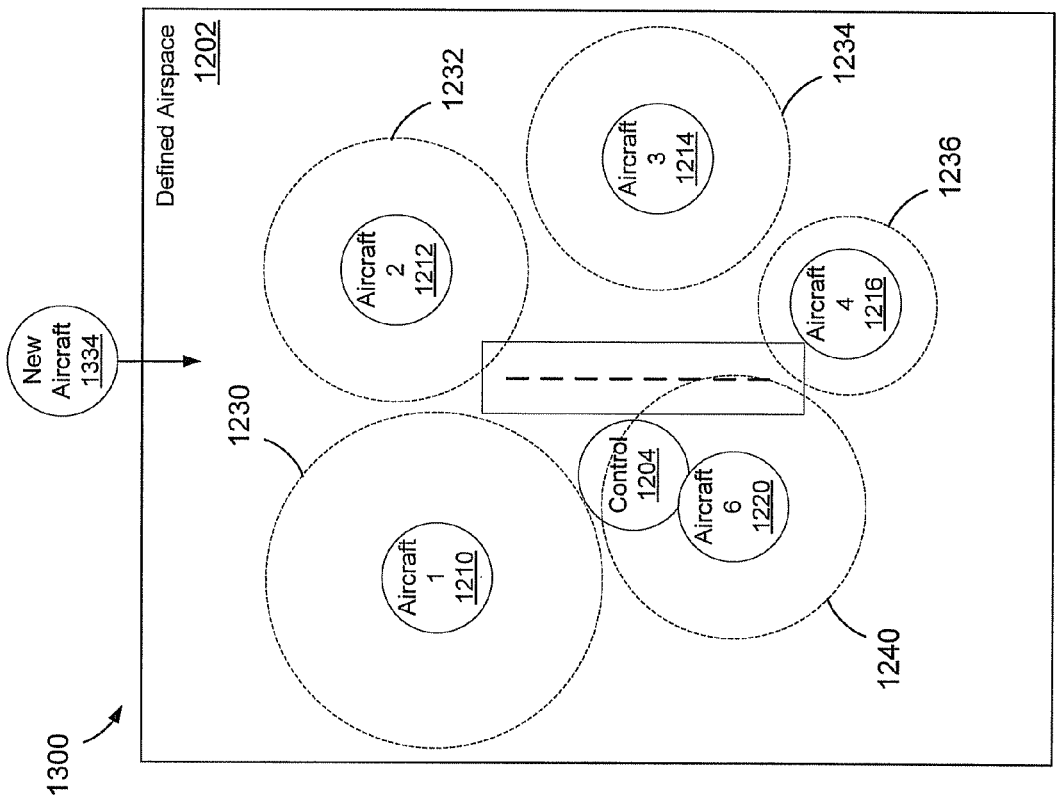

FIGS. 13A-13B show systems 1300, 1350 of aircraft 1210-1216 and 1220 being repositioned in the defined airspace 1202 when a new aircraft 1334 enters the defined airspace 1202. As shown in FIG. 13A, before the new aircraft 1334 enters the defined airspace 1202, the other aircraft 1210-1216 and 1220 may act independently of the new aircraft 1334. Potential field methods only are applied to agents that affect constraints of other agents.

FIG. 13B shows that, when the new aircraft 1334 enters the defined airspace 1202, a potential field is assigned to the new aircraft 1334 to model a minimum separation distance 1344 for the new aircraft 1334. As previously described, the potential field modeling the minimum separation distance may depend on the size of the new aircraft 1334 and even the specific type of the new aircraft 1334. With the potential field assigned, the control tower 1204, the aircraft 1210-1216, 1220, and 1234, or another agent computing the potential fields solution can determine new trajectories for the aircraft 1210-1216, 1220, and 1234 so that all of the aircraft 1210-1216, 1220, and 1234 are safely accommodated in the defined airspace 1202.

Figure 14:
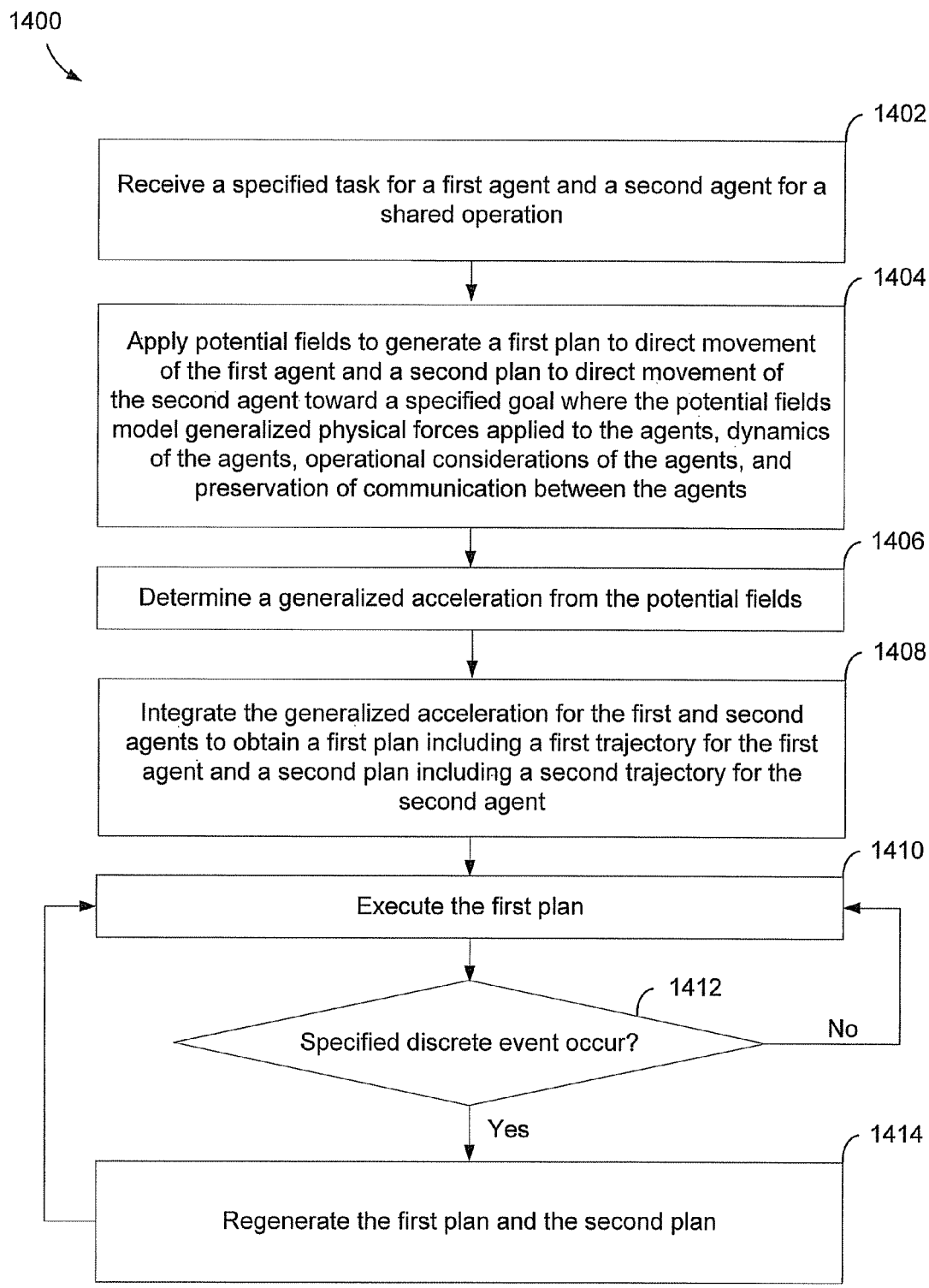
FIG. 14 is a flow diagram of an illustrative embodiment of a method to coordinate a plurality of agents using potential field methods.

FIG. 14 is a flow diagram of an illustrative embodiment of a method 1400 to coordinate a plurality of agents using potential field methods. A specified task for a first agent and a second agent for a shared operation is received, at 1402. Potential fields are applied to generate a first plan to direct movement of the first agent and a second plan to direct movement of the second agent, at 1404. The plans generated enable the agents to move toward a specified goal where the potential fields model generalized physical forces applied to the agents, dynamics of the agents, operational considerations of the agents, and communication ranges to maintain communication between the agents. A generalized acceleration is determined from the potential fields, at 1406, as previously described with reference to Eqs. (1-34). The generalized acceleration for the first and second agents is integrated to obtain a first plan including a first trajectory for the first agent and a second plan including a second trajectory for the second agent, at 1408. The first plan is executed by the first agent, at 1410. It is determined if a specified discrete event has occurred, at 1412, and as previously described with reference to FIG. 1. If it is determined at 1412 that a specified discrete event has not occurred, execution of the first plan continues, at 1410. Otherwise, if it is determined at 1412 that a specified discrete event has occurred, the first plan and the second plan are regenerated accordingly, at 1414.

It should be noted that the method 1400 results in the generation, and possible regeneration, of both a first plan for a first agent and a second plan for a second agent, although the method 1400 only describes the execution of the first plan. The method 1400 is directed to the operation of only the first agent. However, as should be appreciated based on the foregoing discussion, regardless of whether the potential fields representing the constraints of the agents are computed at a central point or by the agents themselves, the plan of each of the agents may affect the plan of other agents. Thus, while the method 1400 describes only execution of the first plan, the generation and regeneration of the first plan depends on the second plan for a second agent, as well as any additional plans for any other agents when the potential fields for the constraints of those agents interact with the potential fields of the first agent.

Figure 15:
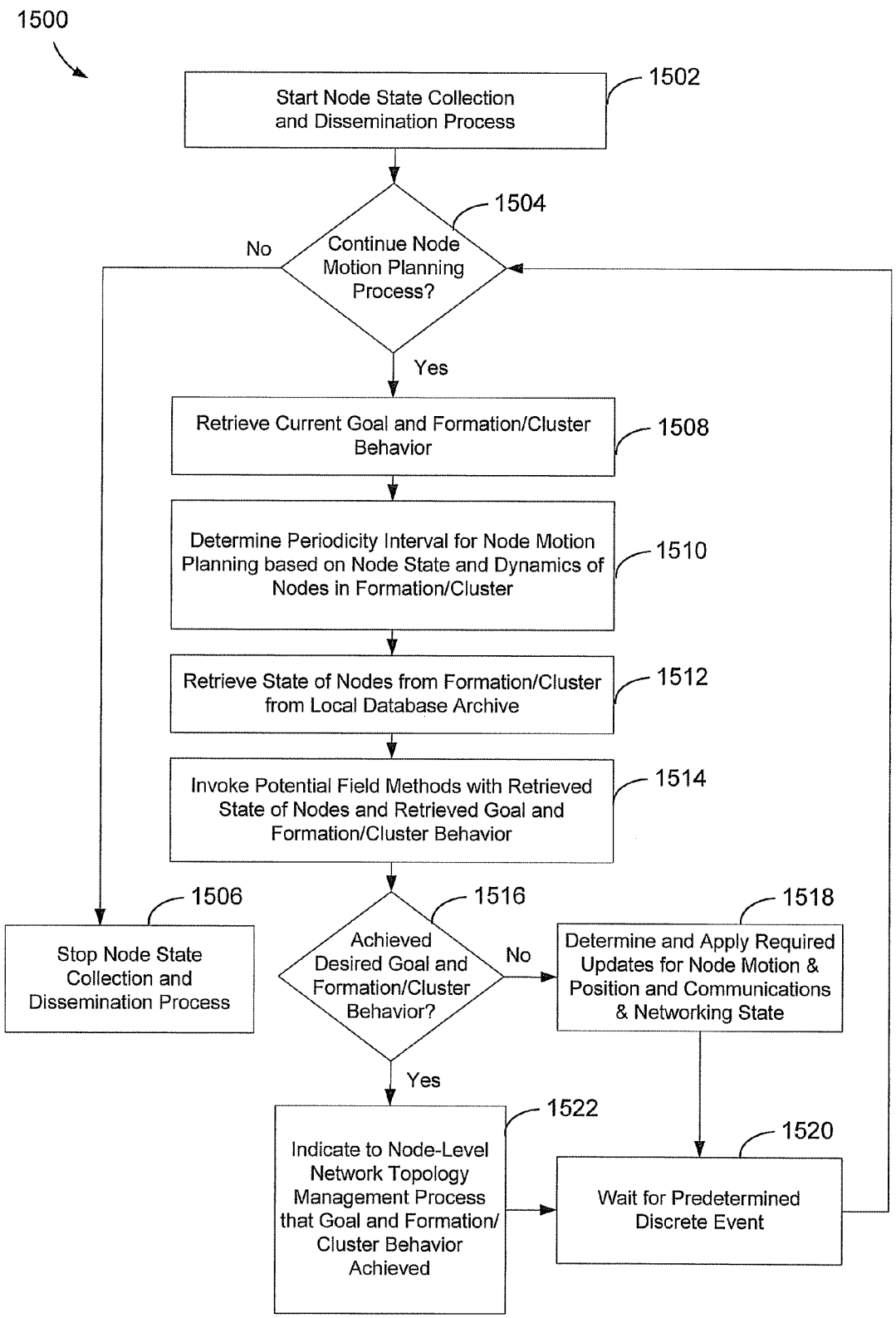
FIG. 15 is a flow diagram of an illustrative embodiment of a method to collect information from and disseminate information to a plurality of agents.
Figure 16:
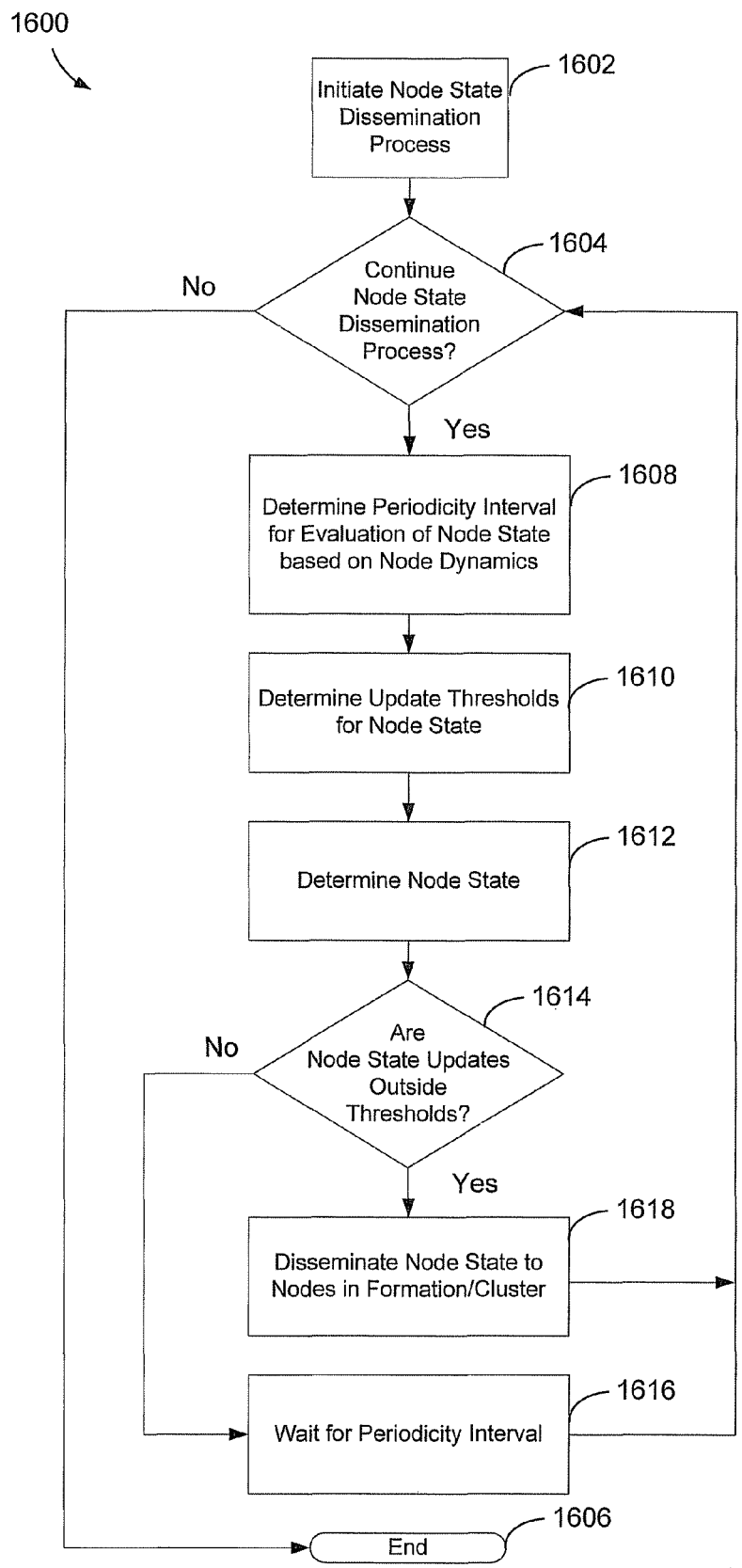
FIG. 16 is a flow diagram of an illustrative embodiment of a method to disseminate information to a plurality of agents.
Figure 17:
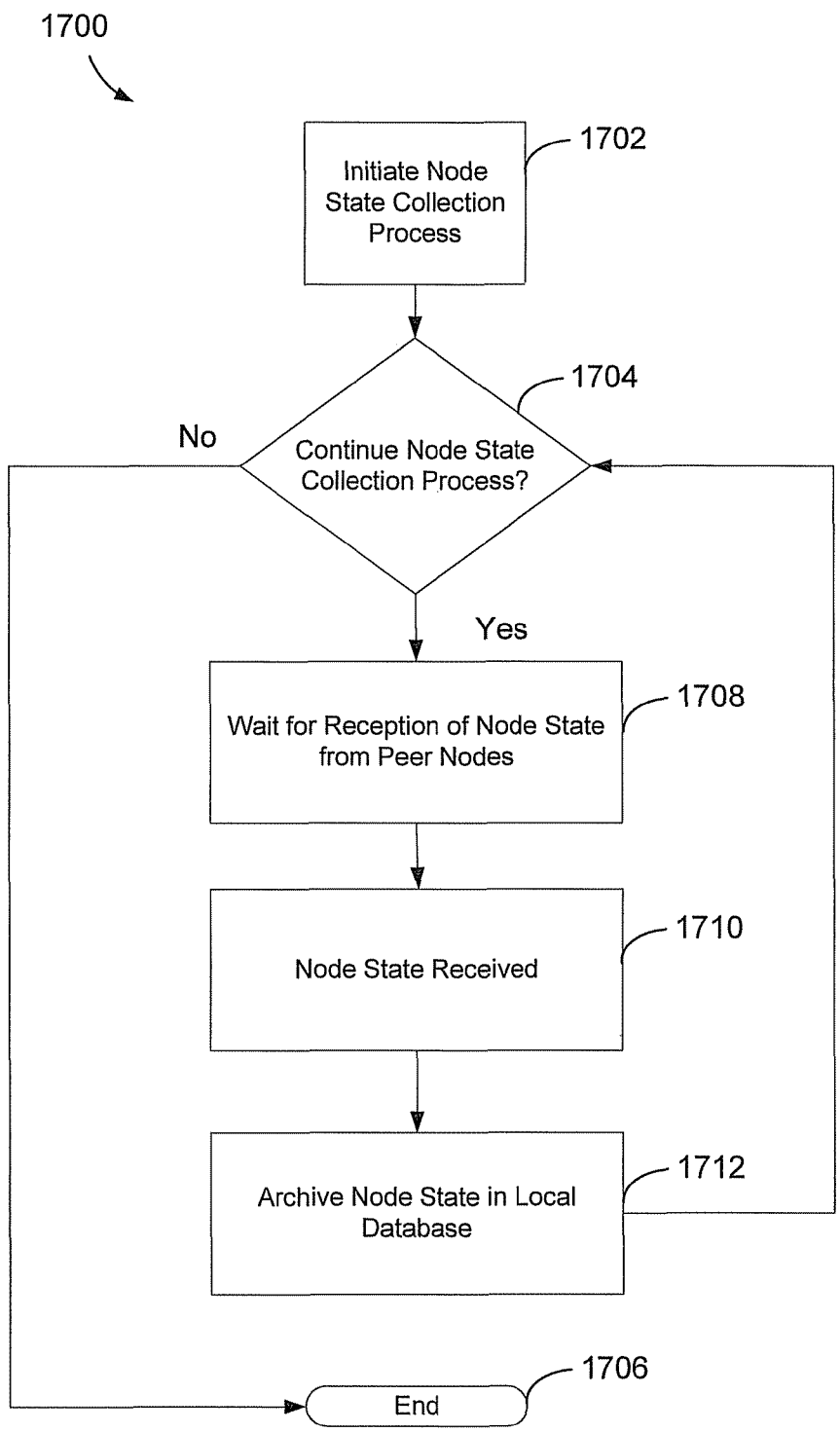
FIG. 17 is a flow diagram of an illustrative embodiment of a method to collect information from a plurality of agents.

As previously described, agents may communicate with other agents to share information about the status of each of the agents. The information may include information about the capabilities of the agents to move or to communicate, information about terrain, atmospheric or other conditions, and other information that may affect the execution of the shared operation. With a large group of agents, it may not be possible to continually update other agents with status information. Instead, according to a particular illustrative embodiment, the agents collect or disseminate information upon the occurrence of predetermined discrete events. The discrete events may include passage of an interval of time, reaching a particular physical location, and other events. FIGS. 15-17 describe illustrative embodiments of methods for collecting and disseminating information between agents.

FIG. 15 is a flow diagram of an illustrative embodiment of a method 1500 to collect information from and disseminate information to a plurality of agents. A node state collection and dissemination process begins, at 1502. It is determined if a node motion planning process should continue, at 1504. When it is determined at 1504 that the node motion planning process should not continue, the method 1500 advances to 1506 where the node state collection and dissemination process stops. Otherwise, if it is determined at 1504 that the node motion planning process should continue, current goal and formation or cluster behavior that informs the application of the potential fields is retrieved, at 1508. A periodicity interval for node motion planning based on node state and dynamics of nodes in the formation or cluster of nodes is determined, at 1510, as previously described with reference to FIG. 5. The state of nodes is retrieved for the formation or cluster from a local database, such as maintained in a memory, at 1512. As previously described, a central node may compute the potential fields, in which case the local database is maintained in a local database of the central node. Alternatively, as also previously described, if the nodes themselves compute the potential fields, each of the nodes will maintain its own local database.

Potential field methods, using the retrieved state of nodes and retrieved goal and formation or cluster behavior, are invoked, at 1514. It is determined if a desired goal and desired formation or cluster behavior has been achieved, at 1516. If it is determined at 1516 that the desired behavior has not been achieved, updates for node motion position and communications and networking states are determined and applied, at 1518. The agent then waits for a predetermined discrete event to gather additional information, at 1520. If it is determined that desired goal and desired formation or cluster behavior has been achieved at 1516, achievement of desired behavior is indicated to a node-level network topology or management process, at 1522. After waiting for the predetermined discrete event, such as lapse of the periodicity interval, the method then moves to 1504 to determine if the node state collection and dissemination process should continue.

FIG. 16 is a flow diagram of an example of an illustrative embodiment of a method 1600 to disseminate information to other agents of a plurality of agents as described with reference to FIG. 15. A node state dissemination process is initiated, at 1602. It is determined if the node state dissemination process should continue, at 1604. If it is determined at 1604 that the node state dissemination process should not continue, the method 1600 ends, at 1606. Otherwise, if it is determined at 1604 that the node state dissemination process should continue, a periodicity interval may be determined for evaluation of node states based on node dynamics, at 1608. When a periodicity interval is determined, the periodicity interval acts as a discrete event that prompts one or more of the nodes to collect or disseminate information, as previously described.

Update thresholds for determining node states are determined, at 1610. The node states are determined, at 1612. It is determined if the node state updates are outside the thresholds, at 1614, indicating that dissemination of information is overdue. If it is determined at 1614 that the updates are not outside the thresholds, the periodicity interval for disseminating information is awaited, at 1616. Otherwise, if it is determined that the updates are outside the thresholds, the node states are disseminated to nodes in the formation or cluster, at 1618. In either case, from 1616 and 1618, the method then moves to 1604 to determine if the node state dissemination process should continue.

FIG. 17 is a flow diagram of an example of an illustrative embodiment of a method 1700 to collect information from a plurality of agents as described with reference to FIG. 15. A node state collection process is initiated, at 1702. It is determined if a node state collection process should continue, at 1704. If it is determined at 1704 that the node state collection process should not continue, for example, upon completing the shared operation, the node state collection process ends, at 1706. Otherwise, if it is determined at 1704 that the node state collection process should continue, reception of node states from peer nodes is awaited, at 1708. The node state information is received, at 1710. The node state information is archived in a local database, at 1712. The method 1700 then moves to 1704 to determine if node state information collection should continue.

Figure 18:
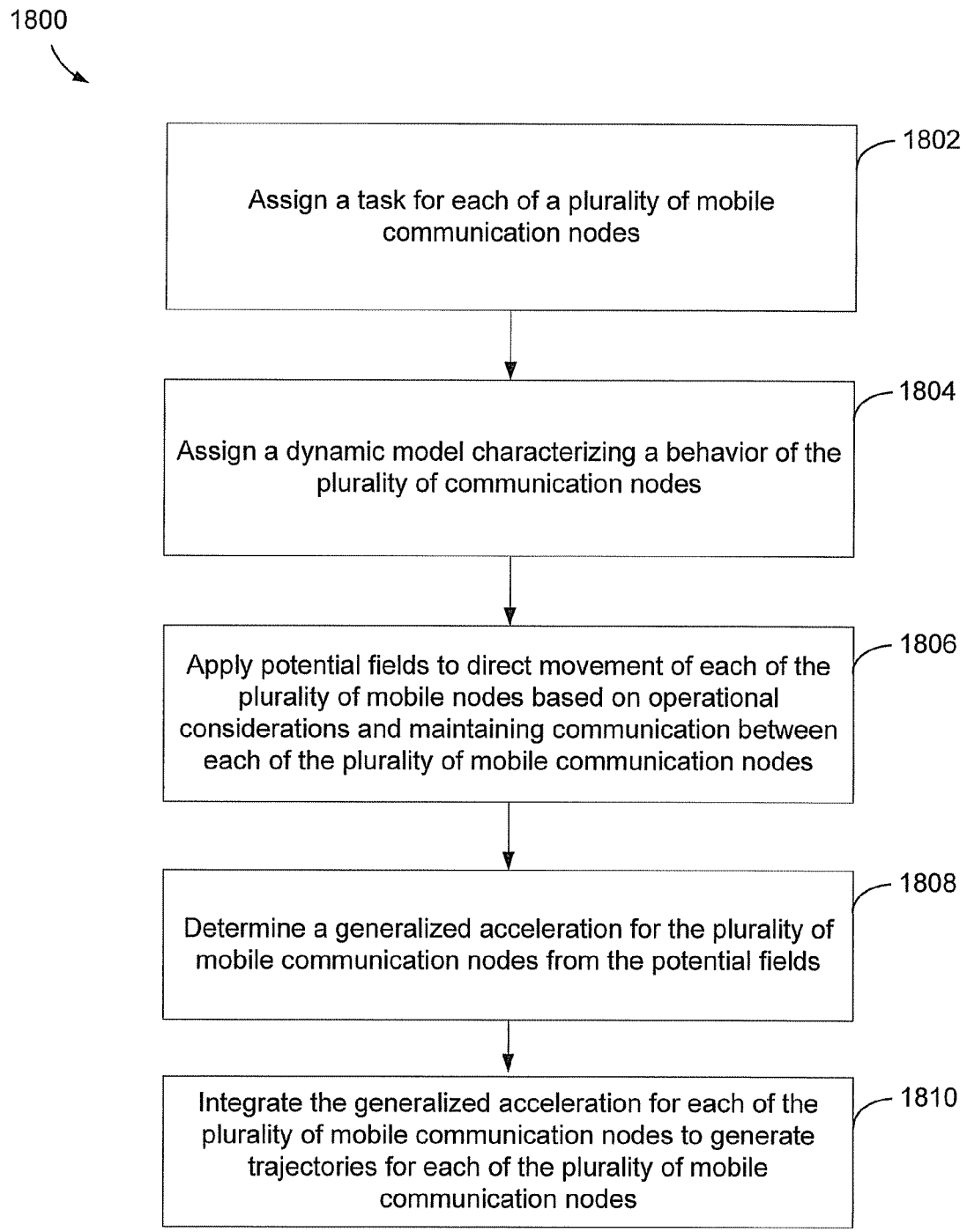
FIG. 18 is a flow diagram of an illustrative embodiment of a method to coordinate deployment of a plurality of communication nodes.
Figure 19:
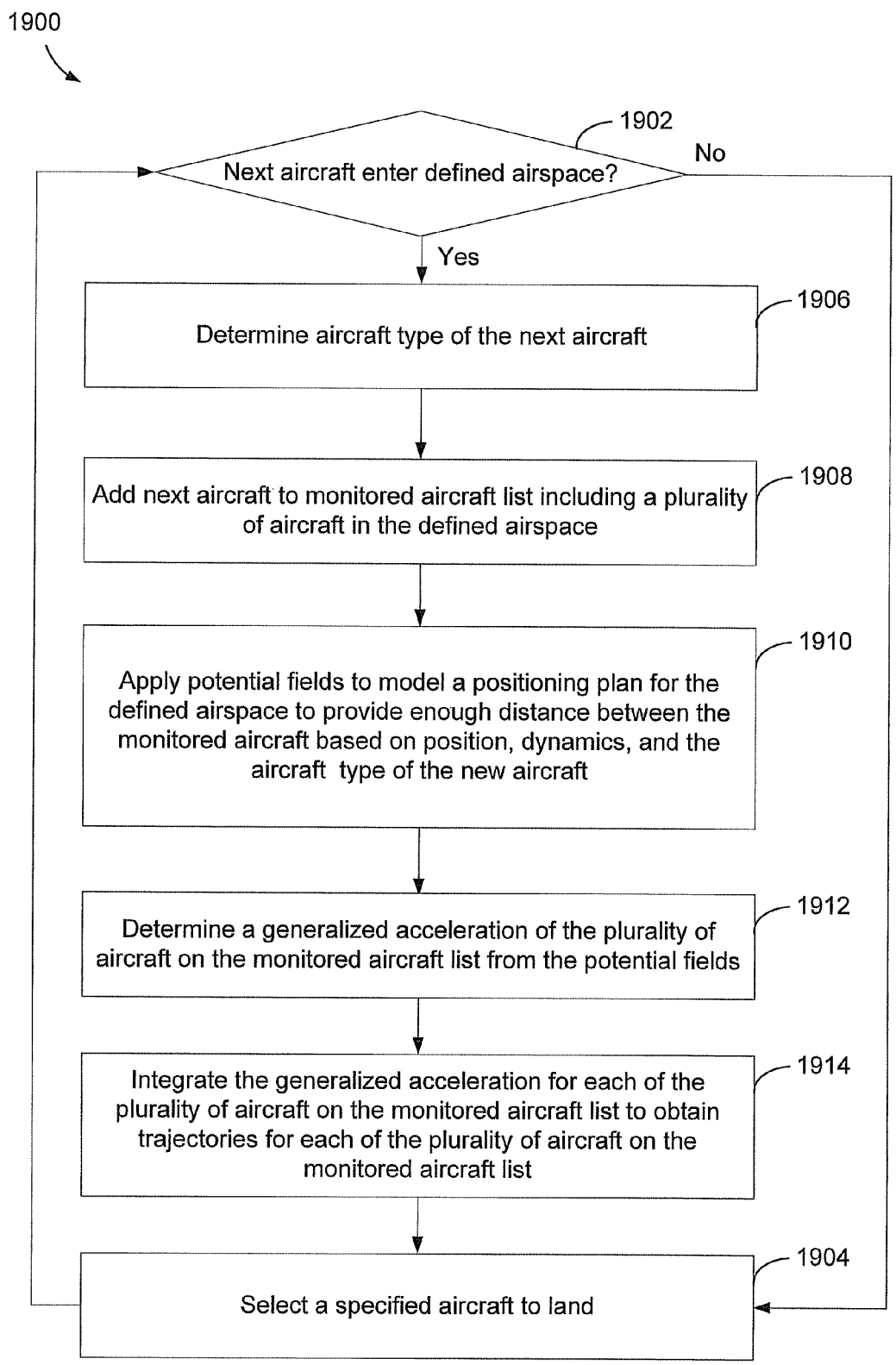
FIG. 19 is a flow diagram of an illustrative embodiment of a method to manage air traffic for a plurality of aircraft in a defined airspace.
Figure 20:
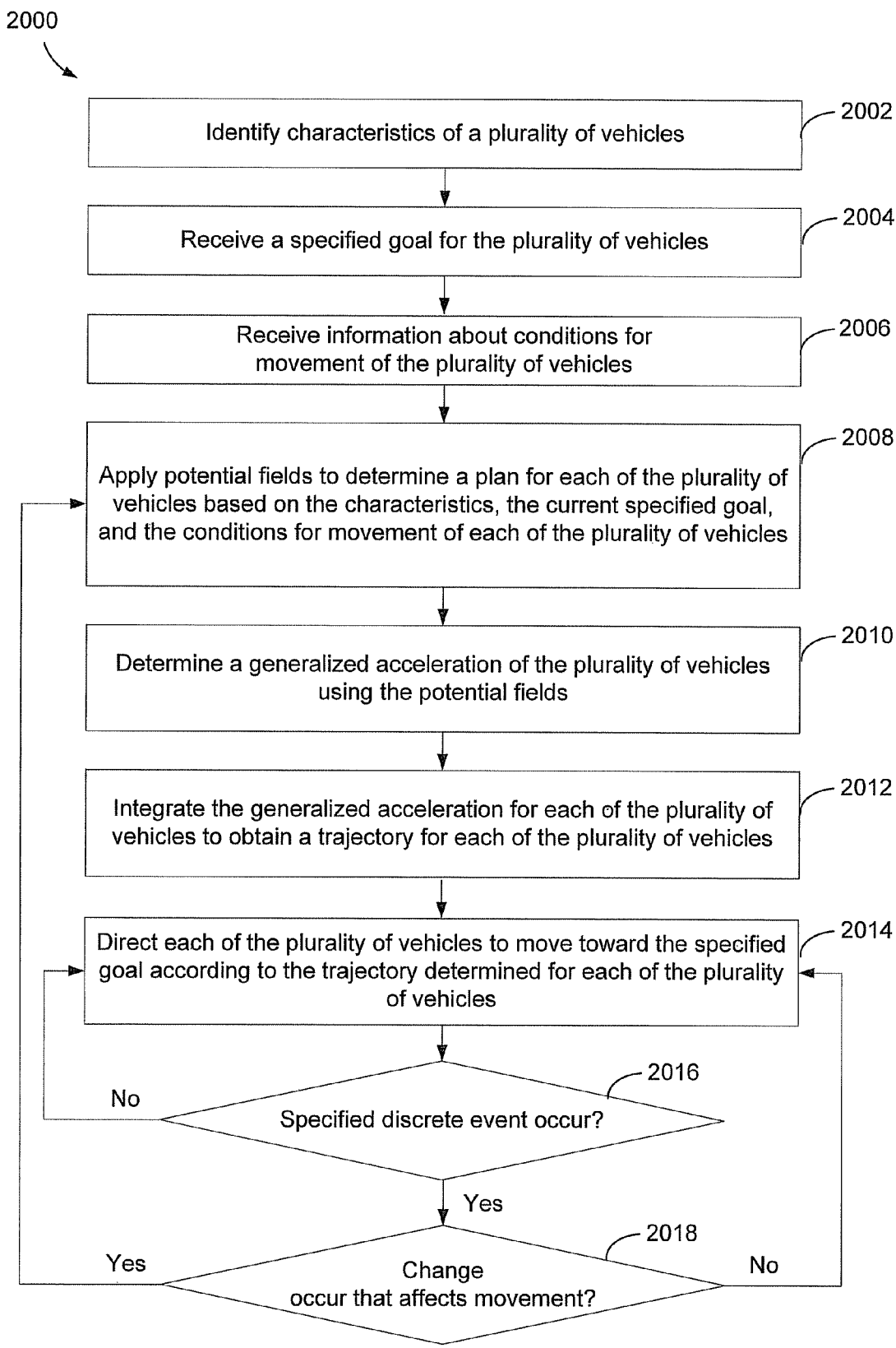
FIG. 20 is a flow diagram of an illustrative embodiment of a method to coordinate movement of a plurality of vehicles.

The foregoing embodiments of directing a plurality of agents through the application of potential field methods and the collection of information from and the dissemination of information to other agents may be employed in a variety of contexts and applications. FIGS. 18-20 describe three different applications for the use of potential field methods in controlling agents: the deployment of communication nodes (FIG. 18); coordinating the approach and landing of aircraft (FIG. 19), and coordinating movement of a plurality of vehicles.

FIG. 18 is a flow diagram of an illustrative embodiment of a method 1800 to coordinate deployment of a plurality of communication nodes. A task is assigned for each of a plurality of mobile communication nodes, at 1802. A dynamic model characterizing a behavior of the plurality of communication nodes is assigned, at 1804. Potential fields are applied to direct movement of each of the plurality of mobile nodes based on operational considerations and maintaining communication between each of the plurality of mobile communication nodes, at 1806. A generalized acceleration for the plurality of mobile communication nodes from the potential fields is determined, at 1808. The generalized acceleration for each of the plurality of mobile communication nodes is integrated to generate trajectories for each of the plurality of mobile communication nodes, at 1810.

Once the communication nodes are deployed, as described with reference to FIG. 18, the communication nodes facilitate an end-to-end network across a region in which the communication nodes are positioned. As described, applying potential field methods to the deployment of the communication nodes positions each node so that it is within a maximum communication range of one or more other communication nodes while being far enough from the other nodes so as not to cause interference. Because the communication nodes are in communication with each other, the nodes can carry communications from other sources through the network of communication nodes to other parties. Because the communication nodes include mobile communication nodes, the communication nodes are reconfigurable to adjust for a failed node or other issues as described with reference to FIGS. 11A and 11B.

FIG. 19 is a flow diagram of an illustrative embodiment of a method 1900 to manage air traffic for a plurality of aircraft in a defined airspace. It is determined if a next aircraft, such as a new aircraft as described with reference to FIGS. 13A and 13B, has entered a defined airspace, at 1902. If it is determined that no next aircraft has entered the defined airspace at 1902, the method 1900 advances to select a specified aircraft to land, at 1904. Otherwise, it is determined at 1902 that a next aircraft has entered the airspace, an aircraft type of the next aircraft is determined; at 1906. The next aircraft is added to a monitored aircraft list of the plurality of aircraft in the defined airspace, at 1908. Potential fields are applied to model a positioning plan for the defined airspace to provide enough distance between the monitored aircraft based on position, dynamics, and the aircraft type of the new aircraft, at 1910. A generalized acceleration is determined for the plurality of aircraft on the monitored aircraft list from the potential fields, at 1912. The generalized acceleration for each of the plurality of aircraft on the monitored aircraft list is integrated to obtain trajectories for each of the plurality of aircraft on the monitored aircraft list, at 1914.

FIG. 20 is a flow diagram of an illustrative embodiment of a method 2000 to coordinate movement of a plurality of vehicles. Characteristics of a plurality of vehicles are identified, at 2002. A specified goal for the plurality of vehicles is received, at 2004. Information about conditions for movement of the plurality of vehicles is received, at 2006. Potential fields are applied to determine a plan for each of the plurality of vehicles based on the characteristics, the current specified goal, and the conditions for movement of each of the plurality of vehicles, at 2008. A generalized acceleration of the plurality of vehicles using the potential fields is determined, at 2010. The generalized acceleration for each of the plurality of vehicles is integrated to obtain a trajectory for each of the plurality of vehicles, at 2012. Each of the plurality of vehicles is directed to move toward the specified goal according to the trajectory determined for each of plurality of vehicles, at 2014.

It is determined if a specified discrete event has occurred, at 2016. If it is determined at 2016 that no specified discrete event has occurred, the method 2000 continues to direct each of the plurality of vehicles to move toward the specified goal according to the trajectory determined for each of the plurality of vehicles, at 2014. Otherwise, if it is determined at 2016 that a specified discrete event has occurred, it is determined if a change has occurred that affects the movement of the vehicles, at 2018. If it is determined that no change has occurred that affects the movement of the vehicles at 2018, the method 2000 continues to direct each of the plurality of vehicles to move toward the specified goal according to the trajectory determined for each of the plurality of vehicles, at 2014. Otherwise, if it is determined at 2018 that a change that affects the movement of the vehicles has occurred, the method 2000 moves to 2008 to again apply potential fields to determine a plan for each of the plurality of vehicles. Thus, with reference to FIG. 5, a particular illustrative embodiment may be used for the movement of a plurality of vehicles between the boundaries 520, 522 and around an obstacle 550, overcoming terrain changes 530 and atmospheric issues 540, to reach a goal 140.

Figure 21:
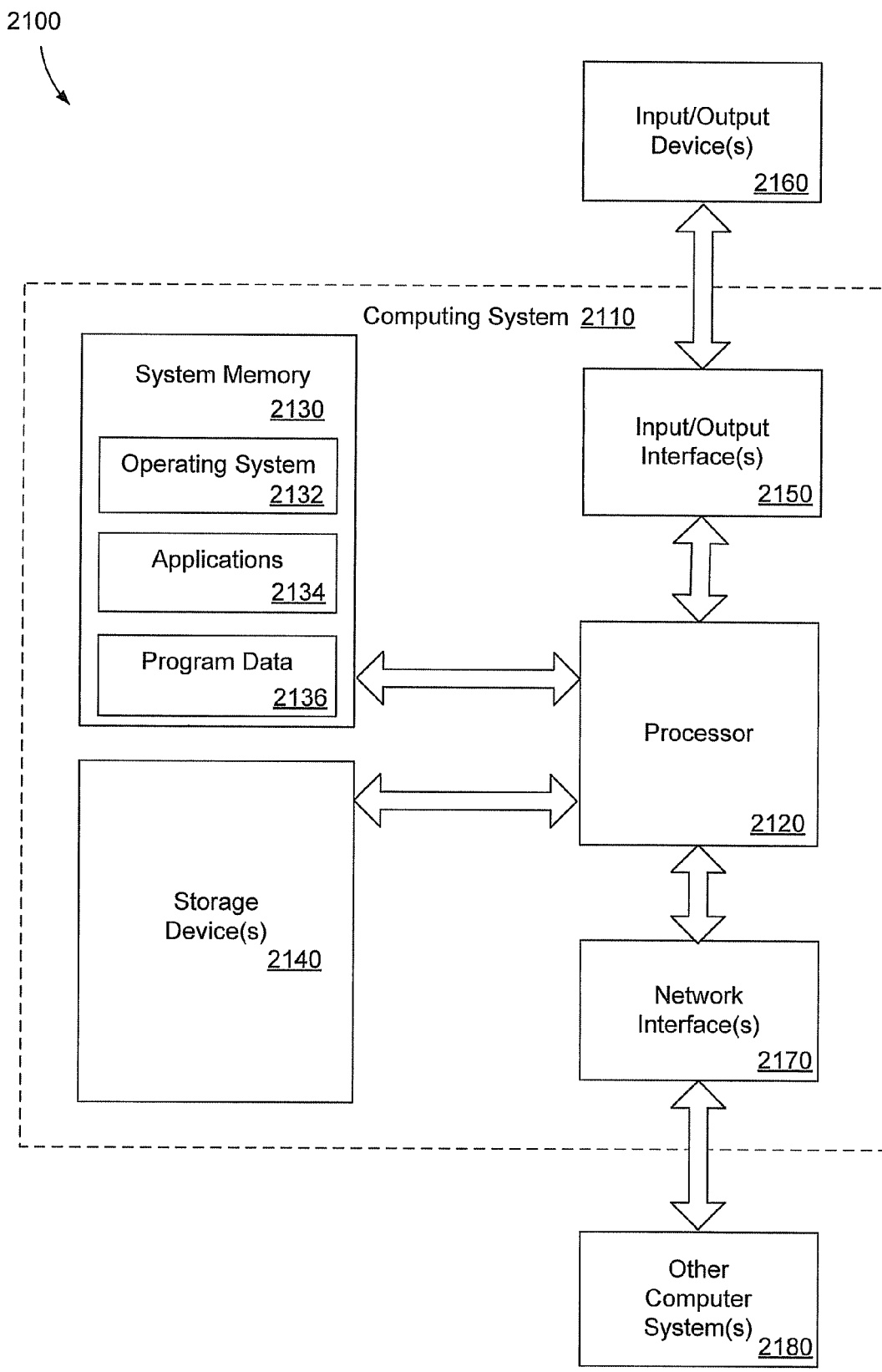
FIG. 21 is a block diagram of a general purpose computer system operable to implement embodiments of computer-implemented methods and computer-executable program instructions in coordinating a plurality of agents in a shared operation.

FIG. 21 is a block diagram of a general purpose computing environment 2100 operable to implement embodiments of computer-implemented methods and computer-executable program instructions in coordinating a plurality of agents in a shared operation as described with reference to FIGS. 1-20. In one illustrative embodiment, a computing system 2110 includes an agent, which may be autonomous, or the computing system 2110 may direct a human operator. The computing system 2110 includes at least one processor 2120. Within the computing system 2110, the processor 2120 communicates with a system memory 2130, one or more storage devices 2140, one or more input/output devices 2160, and one or more network interfaces 2170 through which the computing system 2110 communicates with one or more other computer systems 2180.

The system memory 2130 may include volatile memory devices, such as random access memory (RAM) devices and nonvolatile memory devices such as read-only memory (ROM), programmable read-only memory, and flash memory. The system memory 2130 typically includes an operating system 2132, which may include a basic/input output system for booting the computing system 2110 as well as a full operating system to enable the computing system 2110 to interact with users, other programs, and other computer systems 2180. The system memory 2130 also typically includes one or more application programs 2134, such as programs that direct the autonomous agent in the performance of actions that are part of the tasks that, in turn, may be part of a shared plan. The system memory 2130 also may include program data 2136, such as status information for the local agent or one or more other agents, as previously described.

The processor 2120 also communicates with one or more storage devices 2140. The storage devices 2140 may include nonvolatile storage devices such as magnetic disks, optical disks, or flash memory devices.

The processor 2120 communicates via one or more input/output interfaces 2150 with one or more input/output devices 2160 that enable the computing device 2110 to interact with a user. The input/output devices 2160 may include keyboards, pointing devices, microphones, speakers, and displays. The processor 2120 also communicates with one or more network interfaces 2170 that enable the computing device 2110, as used in an agent, to communicate with other agents.

Not all of the components or devices illustrated in FIG. 21 or otherwise described in the previous paragraphs are necessary to support implementations of the present disclosure. For example, a device may include an integrated system memory and storage device including a flash memory configured to store all programs and data for operation of a system. In addition, if all input and output is communicated via the network interfaces 2170, a system may not include any other input/output interfaces 2150 or input/output devices 2160.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. For example, method steps may be performed in a different order than is shown in the figures or one or more method steps may be omitted. Accordingly, the disclosure and the figures are to be regarded as illustrative rather than restrictive.

Moreover, although specific embodiments have been illustrated and described herein, it should be appreciated that any subsequent arrangement designed to achieve the same or similar results may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, the claimed subject matter may be directed to less than all of the features of any of the disclosed embodiments:

What is claimed is:
1. A computer-implemented method comprising:
receiving a task at a processor of a first mobile communication node of a plurality of mobile communication nodes, wherein the first mobile communication node is to coordinate performance of the task with remaining mobile communication nodes of the plurality of mobile communication nodes;

assigning, at the processor, a dynamic model characterizing a behavior of the first node and a behavior of each of the remaining mobile communication nodes during the performance of the task;

applying, at the processor, potential fields to the dynamic model to determine a trajectory of the first mobile communication node and to determine a trajectory of each of the remaining mobile communication nodes; and directing, at the processor, movement of the first mobile communication node based on the trajectory of the first mobile communication node and the trajectory of each of the remaining mobile communication nodes such that when each of the plurality of mobile communication nodes performs the task, the plurality of mobile communication nodes provide a communication network to serve a communication area.

2. The computer-implemented method of claim 1, wherein applying potential fields to the dynamic model to direct movement of each of the plurality of mobile communication nodes is based on:

operational considerations potentially affecting one of movability and communication capabilities of each of the plurality of mobile communication nodes; and maintaining communication between each of the plurality of mobile communication nodes based on communication range parameters for each of the plurality of mobile communication nodes.

3. The computer-implemented method of claim 2, wherein the operational considerations comprise physical conditions including at least one of terrain, nautical conditions, atmospheric conditions, and one or more obstacles.

4. The computer-implemented method of claim 2, wherein the communication range parameters of each of the plurality of mobile communication nodes include at least one of:

maximum distance to communicate with another of the plurality of mobile communication nodes; and minimum distance to communicate with another of the plurality of mobile communication nodes.

5. The computer-implemented method of claim 4, wherein the operational considerations include a minimum separation distance between adjacent mobile communication nodes of the plurality of mobile communication nodes.

6. The computer-implemented method of claim 5, wherein at least one of the potential fields is subordinate to another one of the potential fields.

7. The computer-implemented method of claim 6, wherein a first potential field corresponds to the minimum separation distance between adjacent mobile communication nodes and wherein a second potential field corresponds to the minimum distance to communicate with another of the plurality of mobile communication nodes.

8. The computer-implemented method of claim 7, wherein the second potential field is subordinate to the first potential field.

9. The computer-implemented method of claim 1, further comprising:

at the first mobile communication node:

determining a generalized acceleration for the plurality of mobile communication nodes from the potential fields; and integrating the generalized acceleration for each of the plurality of mobile communication nodes to generate the trajectory of the first mobile communication node and to generate the trajectories of each of the remaining mobile communication nodes.

10. The computer-implemented method of claim 1, wherein each of the plurality of mobile communication nodes includes one of a ground-based communication node, a water-based communication node, and an air-based communication node.

11. The computer-implemented method of claim 1, further comprising:

at the first mobile communication node:

monitoring a status of each of the remaining mobile communication nodes to identify a failure of an identified mobile communication node of the plurality of mobile communication nodes;

upon identification of the failure:

removing the identified mobile communication node from the remaining mobile communication nodes to generate a subset of remaining mobile communication nodes; and reapplying potential fields to the dynamic model to determine a trajectory of the first mobile communication node and to determine a trajectory of each mobile communication node in the subset of remaining mobile communication nodes; and redirecting movement of the first mobile communication node based on the trajectory of the first mobile communication node and the trajectory of each mobile communication node in the subset of remaining mobile communication nodes to modify a coverage of the communications network to provide service to at least a portion of the communications area previously served by the identified mobile communication node.

12. The computer-implemented method of claim 11, wherein the failure includes one of a current failure and an impending failure.

13. The computer-implemented method of claim 1, wherein at least one of the plurality of mobile communication nodes is a self-deployed robotic agent.

14. The computer-implemented method of claim 1, wherein the dynamic model includes a model of a vector representing generalized physical forces and an acceleration for each of the plurality of mobile communication nodes.

15. The computer-implemented method of claim 1, wherein the first mobile communication node communicates with the remaining mobile communication nodes via a first communication system and wherein the first mobile communication node provides at least a portion of the communication network via a second communication system that is different than the first communication system.

* * * * *